US012294960B2

(12) United States Patent
Sun et al.

(10) Patent No.: US 12,294,960 B2
(45) Date of Patent: May 6, 2025

(54) METHOD FOR TRANSMITTING COMMON SIGNAL AND APPARATUS THEREOF

(71) Applicant: Huawei Technologies Co., Ltd., Guangdong (CN)

(72) Inventors: Jingyuan Sun, Shenzhen (CN); Liang Xia, Shenzhen (CN); Yongxing Zhou, Beijing (CN); Xiaotao Ren, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 499 days.

(21) Appl. No.: 14/870,533

(22) Filed: Sep. 30, 2015

(65) Prior Publication Data
US 2016/0021632 A1 Jan. 21, 2016

Related U.S. Application Data

(63) Continuation of application No. PCT/CN2013/073822, filed on Apr. 7, 2013.

(51) Int. Cl.
H04W 56/00 (2009.01)
H04J 11/00 (2006.01)
(Continued)

(52) U.S. Cl.
CPC ......... *H04W 56/001* (2013.01); *H04J 11/005* (2013.01); *H04L 5/005* (2013.01);
(Continued)

(58) Field of Classification Search
CPC .... H04W 56/001; H04W 24/10; H04L 5/005; H04L 5/0073; H04L 43/16
See application file for complete search history.

(56) References Cited

U.S. PATENT DOCUMENTS 8,965,391 B1 * 2/2015 Marupaduga ......... H04W 48/12
455/418
2003/0148764 A1 8/2003 Kelley
(Continued)

FOREIGN PATENT DOCUMENTS

CN 1736114 B 10/2010
CN 101958743 A 1/2011
(Continued)

OTHER PUBLICATIONS

CN 20185991329, Search Report, Apr. 30, 2019.
CN 20180599132.9, Office Action, Apr. 30, 2019.

Primary Examiner — Jay L Vogel

(57) ABSTRACT

The present invention discloses a method for transmitting a common signal and an apparatus thereof. The method includes: determining, by a first base station, a first configuration used to send a common signal; and sending, by the first base station, the common signal according to the first configuration. According to the method for transmitting a common signal and the apparatus thereof in embodiments of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

45 Claims, 10 Drawing Sheets

A first base station determines a first configuration used to send a common signal ~110

The first base station sends the common signal according to the first configuration ~120

(51) Int. Cl.
  *H04L 5/00* (2006.01)
  *H04L 43/16* (2022.01)
  *H04W 24/10* (2009.01)

(52) U.S. Cl.
  CPC ............ *H04L 5/0073* (2013.01); *H04L 43/16* (2013.01); *H04W 24/10* (2013.01); *H04W 56/00* (2013.01)

(56) References Cited

U.S. PATENT DOCUMENTS

| | | | |
|---|---|---|---|
| 2010/0182903 A1* | 7/2010 | Palanki | H04W 28/0284 370/252 |
| 2010/0265874 A1 | 10/2010 | Palanki et al. | |
| 2011/0235743 A1 | 9/2011 | Lee et al. | |
| 2012/0113898 A1 | 5/2012 | Luo et al. | |
| 2012/0208547 A1 | 8/2012 | Geirhofer et al. | |
| 2013/0039331 A1* | 2/2013 | Koorapaty | H04L 5/0048 370/330 |
| 2013/0229953 A1* | 9/2013 | Nam | H04W 72/0426 370/280 |
| 2013/0286965 A1* | 10/2013 | Xu | H04W 16/26 370/329 |
| 2013/0301566 A1* | 11/2013 | Wei | H04W 48/08 370/329 |
| 2013/0322350 A1* | 12/2013 | Gaur | H04L 1/0013 370/329 |
| 2014/0050206 A1* | 2/2014 | Seo | H04J 11/0069 370/336 |
| 2014/0171073 A1* | 6/2014 | Kim | H04W 48/16 455/434 |
| 2014/0241150 A1* | 8/2014 | Ng | H04W 56/00 370/229 |
| 2015/0146673 A1 | 5/2015 | Geirhofer et al. | |
| 2015/0264671 A1 | 9/2015 | Maeda et al. | |
| 2016/0014778 A1 | 1/2016 | Zhou et al. | |
| 2017/0237533 A1 | 8/2017 | Lee et al. | |
| 2017/0280428 A1 | 9/2017 | Kim et al. | |

FOREIGN PATENT DOCUMENTS

| | | |
|---|---|---|
| CN | 102396276 A | 3/2012 |
| CN | 102823168 A | 12/2012 |
| CN | 102905370 A | 1/2013 |
| CN | 103430502 A | 12/2013 |
| CN | 104685923 A | 6/2015 |
| WO | WO 2012/112519 A1 | 8/2012 |
| WO | 2012154004 A2 | 11/2012 |
| WO | 2013025069 A1 | 2/2013 |

* cited by examiner

METHOD FOR TRANSMITTING COMMON SIGNAL AND APPARATUS THEREOF

CROSS-REFERENCE TO RELATED APPLICATIONS

This application is a continuation of International Application No. PCT/CN2013/073822, filed on Apr. 7, 2013, which is hereby incorporated by reference in its entirety.

TECHNICAL FIELD

Embodiments of the present invention relate to the communications field, and more specifically, to a method for transmitting a common signal and an apparatus thereof.

BACKGROUND

In communications technologies, a base station may periodically send a discovery signal (DS), so as to help user equipment to detect and discover a cell. After discovering the cell, the user equipment needs to establish uplink and downlink synchronization with the cell before establishing a communication connection to the cell. In a Long Term Evolution (LTE) system, user equipment and a cell implement establishment of downlink synchronization mainly by using a synchronization signal transmitted over a downlink channel. First, according to a primary synchronization signal (PSS) and a secondary synchronization signal (SSS), the user equipment determines a cell identity and establishes coarse synchronization with the cell. Further, the user equipment may establish fine synchronization and synchronization tracking with the cell according to a cell-specific reference signal (CRS), so as to implement more precise synchronization with the cell in time and frequency. After the fine synchronization is established, the user equipment may receive a broadcast channel (Physical Broadcast Channel, "PBCH" for short) of the cell and receive system information block type 1 (SIB1) of the cell, so as to acquire related parameters of the cell and perform a further operation.

Common signals such as the PSS, the SSS, the PBCH, and the CRS are sent periodically. In addition, locations, of the PSS, the SSS, and the PBCH, in a frequency domain are always central six resource blocks (RB) in system bandwidth, and a location, of the CRS, in the frequency domain is the entire system bandwidth. Even if no user equipment needs these reference signals, each cell always periodically sends these common signals. Therefore, transmission resources occupied by these common signals cannot be used to transmit data of a user, which causes a waste of transmission resources. In addition, sending the common signals may further cause unnecessary interference. For example, a cell does not serve any user or all users in a cell do not need these common signals in a relatively long period of time, but the cell still sends these common signals. As a result, another neighboring cell is interfered at these locations, thereby affecting user experience.

In addition, because both the PSS and the SSS are bound to the cell identity, in a scenario in which one cell is corresponding to multiple nodes, the multiple nodes in the cell send a same PSS and SSS to user equipment, and the user equipment can only establish synchronization with the cell by using common signals including the PSS and the SSS but cannot distinguish between different nodes. Therefore, the user equipment needs to subsequently perform an extra operation so as to establish synchronization with different nodes, thereby leading to a relatively cumbersome interaction process.

Further, for any cell, user equipment can search, only by means of blind detection, for a PSS and an SSS that are corresponding to the cell, and determines a cell identity according to the PSS and the SSS. Therefore, a process of determining the cell identity by the user equipment is relatively complex.

SUMMARY

Embodiments of the present invention provide a method for transmitting a common signal, user equipment, and a base station, so that interference caused by a common signal to a neighboring cell can be relatively low.

According to a first aspect, a method for transmitting a common signal is provided, including: determining, by a first base station, a first configuration used to send a common signal; and sending, by the first base station, the common signal according to the first configuration.

With reference to the first aspect, in a first possible implementation manner, the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

With reference to the first aspect or with reference to the first possible implementation manner of the first aspect, in a second possible implementation manner, before the determining, by a first base station, a first configuration used to send a common signal, the method further includes: determining, by the first base station, that a sending condition of the common signal is met.

With reference to the first aspect or with reference to the first or second possible implementation manner of the first aspect, in a third possible implementation manner, before the sending, by the first base station, the common signal according to the first configuration, the method further includes: sending, by the first base station, first configuration information of the common signal to a second base station, where the first configuration information is used to indicate the first configuration; and/or sending, by the first base station, first configuration information of the common signal to user equipment UE, where the first configuration information is used to indicate the first configuration.

With reference to the first aspect or with reference to the first or second possible implementation manner of the first aspect, in a fourth possible implementation manner, the sending condition of the common signal includes at least one of the following conditions: condition one: the first base station receives first request information sent by a second base station, where the first request information is used to request the first base station to send the common signal; condition two: the first base station receives second request information sent by a first UE, where the second request information is used to request the first base station to send the common signal; and condition three: the first base station receives a measurement report sent by a first UE, and a first parameter that is in the measurement report and used to indicate a channel state between the first UE and the first base station is lower than a preset threshold.

With reference to the fourth possible implementation manner of the first aspect, in a fifth possible implementation manner, before the sending, by the first base station, the common signal according to the first configuration, the method further includes: when the first base station determines that the sending condition one of the common signal is met, sending, by the first base station, first configuration information of the common signal to the second base station, where the first configuration information is used to indicate the first configuration; and/or when the first base station determines that the sending condition two or three of the common signal is met, sending, by the first base station, first configuration information of the common signal to a second UE that includes at least the first UE, where the first configuration information is used to indicate the first configuration.

With reference to the first aspect or with reference to any possible implementation manner of the first to fifth possible implementation manners of the first aspect, in a sixth possible implementation manner, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

With reference to the sixth possible implementation manner of the first aspect, in a seventh possible implementation manner, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

With reference to the sixth or seventh possible implementation manner of the first aspect, in an eighth possible implementation manner, the method further includes: performing, by the first base station, rate matching on at least one first signal, except the common signal, in to-be-sent signals according to the time-frequency resource information of the common signal.

With reference to any possible implementation manner of the sixth to eighth possible implementation manners of the first aspect, in a ninth possible implementation manner, the method further includes: sending, by the first base station, second configuration information to a third UE, where the second configuration information is used to indicate the time-frequency resource information, so that the third UE performs rate matching according to the second configuration information.

With reference to any possible implementation manner of the second to ninth possible implementation manners of the first aspect, in a tenth possible implementation manner, before the determining, by the first base station, that a sending condition of the common signal is met, the first base station stops sending the common signal or sends the common signal by using a third configuration, where a common signal sending period corresponding to the third configuration is greater than a common signal sending period corresponding to the first configuration.

With reference to the first aspect or with reference to any possible implementation manner of the first to tenth possible implementation manners of the first aspect, in an eleventh possible implementation manner, the first configuration is preset on the first base station; or the determining, by a first base station, a first configuration used to send a common signal includes: selecting, by the first base station, the first configuration from multiple preset configurations.

With reference to the first aspect or with reference to any possible implementation manner of the first to eleventh possible implementation manners of the first aspect, in a twelfth possible implementation manner, the method further includes: sending, by the first base station, any other signal or data except the common signal on a time-frequency resource that is reserved for transmitting the common signal but is actually not used to transmit the common signal.

According to a second aspect, a method for transmitting a common signal is provided, where the method is used to send a synchronization signal to user equipment UE in a first cell that belongs to a first base station, the first cell includes at least two nodes, the at least two nodes include a first node and at least one second node, and the method includes: generating, by the first base station, the synchronization signal according to a sequence initialization identifier, where the synchronization signal includes a primary synchronization signal PSS and/or a secondary synchronization signal SSS, and sequence initialization identifiers separately used by the first base station when generating synchronization signals of the at least two nodes are different; and sending, by the first base station, the synchronization signal.

With reference to the second aspect, in a first possible implementation manner, that sequence initialization identifiers separately used by the first base station when generating synchronization signals of the at least two nodes are different includes: the same sequence initialization identifier is used by the first base station when generating the synchronization signal of the at least one second node, and the sequence initialization identifier used by the first base station when generating the synchronization signal of the first node is different from the sequence initialization identifier separately used by the first base station when generating the synchronization signal of the at least one second node; or the sequence initialization identifiers separately used by the first base station when generating the synchronization signals of the at least two nodes are different from each other.

With reference to the second aspect or with reference to the first possible implementation manner of the second aspect, in a second possible implementation manner, the method further includes: sending, by the first base station, indication information to first user equipment UE, where the indication information is used to indicate a cell identity of the first cell.

With reference to the second aspect or with reference to the first or second possible implementation manner of the second aspect, in a third possible implementation manner, before the sending, by the first base station, the synchronization signal, the method further includes: sending, by the first base station, to the first UE the sequence initialization identifier used by the first base station when generating the synchronization signal.

With reference to the second aspect or with reference to any possible implementation manner of the first to third possible implementation manners of the second aspect, in a fourth possible implementation manner, the sequence initialization identifier used by the first base station when generating the synchronization signal of the first node is the cell identity of the first cell.

With reference to the fourth possible implementation manner of the second aspect, in a fifth possible implementation manner, the first node is a node that continuously sends the synchronization signal, so that the first UE first establishes synchronization with the first node in the first cell.

With reference to the second aspect or with reference to any possible implementation manner of the first to fifth possible implementation manners of the second aspect, in a sixth possible implementation manner, before the generating, by the first base station, the synchronization signal according to a sequence initialization identifier, the method further includes: receiving, by the first base station, first request information sent by a second base station, where the first request information is used to request the first base station to send the synchronization signal; and the generating, by the first base station, the synchronization signal according to a sequence initialization identifier includes: generating, by the first base station, the synchronization signal according to the first request information and the sequence initialization identifier.

With reference to the second aspect or with reference to any possible implementation manner of the first to fifth possible implementation manners of the second aspect, in a seventh possible implementation manner, before the generating, by the first base station, the synchronization signal according to a sequence initialization identifier, the method further includes: receiving second request information sent by a second UE, where the second request information is used to request the first base station to send the synchronization signal; and the generating, by the first base station, the synchronization signal according to a sequence initialization identifier includes: generating, by the first base station, the synchronization signal according to the second request information and the sequence initialization identifier.

With reference to the second aspect or with reference to any possible implementation manner of the first to fifth possible implementation manners of the second aspect, in an eighth possible implementation manner, before the generating, by the first base station, the synchronization signal according to a sequence initialization identifier, the method further includes: receiving, by the first base station, a measurement report sent by a second UE, and determining, by the first base station, that a first parameter that is in the measurement report and used to indicate a channel state between the second UE and the first base station is lower than a preset threshold; and the generating, by the first base station, the synchronization signal according to a sequence initialization identifier includes: generating, by the first base station, the synchronization signal according to the sequence initialization identifier and that the first parameter is lower than the preset threshold.

With reference to any possible implementation manner of the second to eighth possible implementation manners of the second aspect, in a ninth possible implementation manner, before the sending, by the first base station, the synchronization signal, the method further includes: sending, by the first base station, configuration information of the synchronization signal to the first UE, where the configuration information is used by the first UE to detect the synchronization signal.

With reference to the ninth possible implementation manner of the second aspect, in a tenth possible implementation manner, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

According to a third aspect, a method for transmitting a common signal is provided, including: determining a first configuration of a common signal; and receiving, according to the first configuration of the common signal, the common signal that is sent by the first base station when a sending condition of the common signal is met.

With reference to the third aspect, in a first possible implementation manner, the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

With reference to the third aspect or with reference to the first possible implementation manner of the third aspect, in a second possible implementation manner, the determining a first configuration of a common signal includes: receiving first configuration information sent by the first base station, where the first configuration information is used to indicate the first configuration.

With reference to the third aspect or with reference to the first or second possible implementation manner of the third aspect, in a third possible implementation manner, the sending condition of the common signal includes at least one of the following conditions: condition one: the first base station receives first request information sent by a second base station, where the first request information is used to request the first base station to send the common signal; condition two: the first base station receives second request information sent by a second UE, where the second request information is used to request the first base station to send the common signal; and condition three: the first base station receives a measurement report sent by a second UE, and a first parameter that is in the measurement report and used to indicate a channel state between the second UE and the first base station is lower than a preset threshold.

With reference to the third aspect or with reference to any possible implementation manner of the first to third possible implementation manners of the third aspect, in a fourth possible implementation manner, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

With reference to the fourth possible implementation manner of the third aspect, in a fifth possible implementation manner, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

With reference to the fourth or fifth possible implementation manner of the third aspect, in a sixth possible implementation manner, the method further includes: performing rate matching on at least one first signal, except the common signal, in to-be-sent signals of the first base station according to the time-frequency resource information of the common signal.

With reference to the third aspect or with reference to any possible implementation manner of the first to sixth possible implementation manners of the third aspect, in a seventh possible implementation manner, the method further includes: receiving, on a time-frequency resource that is reserved for transmitting the common signal but is actually not used to transmit the common signal, any other signal or data, sent by the first base station, except the common signal.

According to a fourth aspect, a method for transmitting a common signal is provided, including: receiving indication information sent by a base station, where the indication information is used to indicate a time-frequency resource occupied by a common signal that is sent by the base station when a sending condition of the common signal is met, and the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1; and performing rate matching according to the indication information.

According to a fifth aspect, a method for transmitting a common signal is provided, where the method is used to receive a synchronization signal sent by a first cell by using a first base station to which the first cell belongs, the first cell includes at least two nodes, the at least two nodes include a first node and at least one second node, and the method includes: acquiring a sequence initialization identifier of a synchronization signal, where the synchronization signal includes a primary synchronization signal PSS and/or a secondary synchronization signal SSS, and sequence initialization identifiers of synchronization signals of the at least two nodes are different; and detecting, according to the sequence initialization identifier of the synchronization signal, the synchronization signal sent by the first base station.

With reference to the fifth aspect, in a first possible implementation manner, the synchronization signal of the at least one second node has the same sequence initialization identifier, and the sequence initialization identifier of the synchronization signal of the first node is different from the sequence initialization identifier of the synchronization signal of the at least one second node; or the sequence initialization identifiers of the synchronization signals of the at least two nodes are different from each other.

With reference to the fifth aspect or with reference to the first possible implementation manner of the fifth aspect, in a second possible implementation manner, the method further includes: receiving indication information sent by the first base station, where the indication information is used to indicate a cell identity of the first cell.

With reference to the fifth aspect or with reference to the first or second possible implementation manner of the fifth aspect, in a third possible implementation manner, the acquiring a sequence initialization identifier of a synchronization signal includes: receiving the sequence initialization identifier that is used by the first base station when generating the synchronization signal and sent by the first base station.

With reference to the fifth aspect or with reference to any possible implementation manner of the first to third possible implementation manners of the fifth aspect, in a fourth possible implementation manner, the sequence initialization identifier of the synchronization signal of the first node is the cell identity of the first cell.

With reference to the fourth possible implementation manner of the fifth aspect, in a fifth possible implementation manner, the first node is a node that continuously sends the synchronization signal, so that user equipment UE first establishes synchronization with the first node in the first cell.

With reference to the fifth aspect or with reference to any possible implementation manner of the first to fifth possible implementation manners of the fifth aspect, in a sixth possible implementation manner, the detecting, according to the sequence initialization identifier of the synchronization signal, the synchronization signal sent by the first base station includes: detecting, according to the sequence initialization identifier of the synchronization signal, the synchronization signal that is sent by the first base station when a sending condition of the common signal is met.

With reference to the sixth possible implementation manner of the fifth aspect, in a seventh possible implementation manner, before the acquiring a sequence initialization identifier of a synchronization signal, the method further includes: sending request information to the first base station, where the request information is used to request the first base station to send the synchronization signal; and the detecting, according to the sequence initialization identifier of the synchronization signal, the synchronization signal that is sent by the first base station when a sending condition of the common signal is met includes: detecting, according to the sequence initialization identifier of the synchronization signal, the synchronization signal sent by the first base station according to the request information.

With reference to the fifth or sixth possible implementation manner of the fifth aspect, in a seventh possible implementation manner, before the detecting, according to the sequence initialization identifier of the synchronization signal, the synchronization signal that is sent by the first base station when a sending condition of the common signal is met, the method further includes: receiving configuration information that is of the synchronization signal and sent by the first base station; and the detecting, according to the sequence initialization identifier of the synchronization signal, the synchronization signal sent by the first base station according to the request information includes: detecting, according to the sequence initialization identifier of the synchronization signal and the configuration information of the synchronization signal, the synchronization signal sent by the first base station according to the request information.

With reference to the seventh possible implementation manner of the fifth aspect, in an eighth possible implementation manner, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

According to a sixth aspect, a base station is provided, including: a first determining module, configured to determine a first configuration used to send a common signal; and a first sending module, configured to send the common signal according to the first configuration determined by the first determining module.

With reference to the sixth aspect, in a first possible implementation manner, the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

With reference to the sixth aspect or with reference to the first possible implementation manner of the sixth aspect, in a second possible implementation manner, the base station further includes: a second determining module, configured to, before the first determining module determines the first configuration used to send the common signal, determine that a sending condition of the common signal is met.

With reference to the sixth aspect or with reference to the first or second possible implementation manner of the sixth aspect, in a third possible implementation manner, the base station further includes: a second sending module, configured to, before the first sending module sends the common signal according to the first configuration, send first configuration information of the common signal to a second base station, where the first configuration information is used to indicate the first configuration; and/or a third sending module, configured to, before the first sending module sends the common signal according to the first configuration, send first configuration information of the common signal to user equipment UE, where the first configuration information is used to indicate the first configuration.

With reference to the sixth aspect or with reference to the first or second possible implementation manner of the sixth aspect, in a fourth possible implementation manner, the sending condition of the common signal includes at least one of the following conditions: condition one: the first base station receives first request information sent by a second base station, where the first request information is used to request the first base station to send the common signal; condition two: the first base station receives second request information sent by a first UE, where the second request information is used to request the first base station to send the common signal; and condition three: the first base station receives a measurement report sent by a first UE, and a first parameter that is in the measurement report and used to indicate a channel state between the first UE and the first base station is lower than a preset threshold.

With reference to the fourth possible implementation manner of the sixth aspect, in a fifth possible implementation manner, the base station further includes: a second sending module, configured to, when the second determining module determines that the sending condition one of the common signal is met, and before the first sending module sends the common signal according to the first configuration, send first configuration information of the common signal to the second base station, where the first configuration information is used to indicate the first configuration; and/or a third sending module, configured to, when the second determining module determines that the sending condition two or three of the common signal is met, and before the first sending module sends the common signal according to the first configuration, send first configuration information of the common signal to a second UE that includes at least the first UE, where the first configuration information is used to indicate the first configuration.

With reference to the sixth aspect or with reference to any possible implementation manner of the first to fifth possible implementation manners of the sixth aspect, in a sixth possible implementation manner, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

With reference to the sixth possible implementation manner of the sixth aspect, in a seventh possible implementation manner, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

With reference to the sixth or seventh possible implementation manner of the sixth aspect, in an eighth possible implementation manner, the base station further includes: a rate matching module, configured to perform rate matching on at least one first signal, except the common signal, in to-be-sent signals according to the time-frequency resource information of the common signal.

With reference to any possible implementation manner of the sixth to eighth possible implementation manners of the sixth aspect, in a ninth possible implementation manner, the base station further includes: a fourth sending module, configured to send second configuration information to a third UE, where the second configuration information is used to indicate the time-frequency resource information, so that the third UE performs rate matching according to the second configuration information.

With reference to any possible implementation manner of the second to ninth possible implementation manners of the sixth aspect, in a tenth possible implementation manner, the first sending module is further configured to, before the second determining module determines that the sending condition of the common signal is met, stop sending the common signal or send the common signal by using a third configuration, where a common signal sending period corresponding to the third configuration is greater than a common signal sending period corresponding to the first configuration.

With reference to the sixth aspect or with reference to any possible implementation manner of the first to tenth possible implementation manners of the sixth aspect, in an eleventh possible implementation manner, the first configuration is preset on the first base station; or the first determining module is specifically configured to select the first configuration from multiple preset configurations.

With reference to the sixth aspect or with reference to any possible implementation manner of the first to eleventh possible implementation manners of the sixth aspect, in a twelfth possible implementation manner, the first sending module is further configured to, send any other signal or data except the common signal on a time-frequency resource that is reserved for transmitting the common signal but is actually not used to transmit the common signal.

According to a seventh aspect, a base station is provided and configured to send a synchronization signal to user equipment UE in a first cell that belongs to the base station, where the first cell includes at least two nodes, the at least two nodes include a first node and at least one second node, and the base station includes: a generating module, configured to generate the synchronization signal according to a sequence initialization identifier, where the synchronization signal includes a primary synchronization signal PSS and/or a secondary synchronization signal SSS, sequence initialization identifiers separately used by the generating module when generating synchronization signals of the at least two nodes are different, and the first cell belongs to the base station; and a sending module, configured to send the synchronization signal generated by the generating module.

With reference to the seventh aspect, in a first possible implementation manner, that sequence initialization identifiers separately used by the generating module when generating synchronization signals of the at least two nodes are different includes: the same sequence initialization identifier is used by the generating module when generating the synchronization signal of the at least one second node, and the sequence initialization identifier used by the generating module when generating the synchronization signal of the first node is different from the sequence initialization identifier separately used by the first base station when generating the synchronization signal of the at least one second node; or the sequence initialization identifiers separately used by the generating module when generating the synchronization signals of the at least two nodes are different from each other.

With reference to the seventh aspect or with reference to the first possible implementation manner of the seventh aspect, in a second possible implementation manner, the sending module is further configured to send indication information to first user equipment UE, where the indication information is used to indicate a cell identity of the first cell.

With reference to the seventh aspect or with reference to the first or second possible implementation manner of the seventh aspect, in a third possible implementation manner, the sending module is further configured to, before the synchronization signal is sent, send, to the first UE, the sequence initialization identifier used by the first base station when generating the synchronization signal.

With reference to the seventh aspect or with reference to any possible implementation manner of the first to third possible implementation manners of the seventh aspect, in a fourth possible implementation manner, the sequence initialization identifier used by the generating module when generating the synchronization signal of the first node is the cell identity of the first cell.

With reference to the fourth possible implementation manner of the seventh aspect, in a fifth possible implementation manner, the first node is a node that continuously sends the synchronization signal, so that the first UE first establishes synchronization with the first node in the first cell.

With reference to the seventh aspect or with reference to any possible implementation manner of the first to fifth possible implementation manners of the seventh aspect, in a sixth possible implementation manner, the base station further includes: a first receiving module, configured to, before the generating module generates the synchronization signal according to the sequence initialization identifier, receive first request information sent by a second base station, where the first request information is used to request the first base station to send the synchronization signal; and the generating module is specifically configured to generate the synchronization signal according to the first request information received by the first receiving module and the sequence initialization identifier.

With reference to the seventh aspect or with reference to any possible implementation manner of the first to fifth possible implementation manners of the seventh aspect, in a seventh possible implementation manner, the base station further includes: a second receiving module, configured to, before the generating module generates the synchronization signal according to the sequence initialization identifier, receive second request information sent by a second UE, where the second request information is used to request the first base station to send the synchronization signal; and the generating module is specifically configured to generate the synchronization signal according to the second request information received by the second receiving module and the sequence initialization identifier.

With reference to the seventh aspect or with reference to any possible implementation manner of the first to fifth possible implementation manners of the seventh aspect, in an eighth possible implementation manner, the base station further includes: a third receiving module, configured to, before the generating module generates the synchronization signal according to the sequence initialization identifier, receive a measurement report sent by a second UE, and a determining module, configured to determine that a first parameter that is in the measurement report received by the third receiving module and is used to indicate a channel state between the second UE and the first base station is lower than a preset threshold; and the generating module is specifically configured to generate the synchronization signal according to the sequence initialization identifier and that the first parameter is lower than the preset threshold, which is determined by the determining module.

With reference to any possible implementation manner of the seventh to eighth possible implementation manners of the seventh aspect, in a ninth possible implementation manner, the sending module is further configured to, before the synchronization signal is sent, send configuration information of the synchronization signal to the first UE, where the configuration information is used by the first UE to detect the synchronization signal.

With reference to the ninth possible implementation manner of the seventh aspect, in a tenth possible implementation manner, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

According to an eighth aspect, user equipment UE is provided, including: a determining module, configured to determine a first configuration of a common signal; and a receiving module, configured to receive, according to the first configuration that is of the common signal and determined by the determining module, the common signal that is sent by the first base station when a sending condition of the common signal is met.

With reference to the eighth aspect, in a first possible implementation manner, the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

With reference to the eighth aspect or with reference to the first possible implementation manner of the eighth aspect, in a second possible implementation manner, the determining module includes: a receiving unit, configured to receive first configuration information sent by the first base station, where the first configuration information is used to indicate the first configuration.

With reference to the eighth aspect or with reference to the first or second possible implementation manner of the eighth aspect, in a third possible implementation manner, the sending condition of the common signal includes at least one of the following conditions: condition one: the first base station receives first request information sent by a second base station, where the first request information is used to request the first base station to send the common signal; condition two: the first base station receives second request information sent by a first UE, where the second request information is used to request the first base station to send the common signal; and condition three: the first base station receives a measurement report sent by a first UE, and a first parameter that is in the measurement report and used to indicate a channel state between the first UE and the first base station is lower than a preset threshold.

With reference to the eighth aspect or with reference to any possible implementation manner of the first to third possible implementation manners of the eighth aspect, in a fourth possible implementation manner, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

With reference to the fourth possible implementation manner of the eighth aspect, in a fifth possible implementation manner, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

With reference to the fourth or fifth possible implementation manner of the eighth aspect, in a sixth possible implementation manner, the UE further includes: a rate matching module, configured to perform rate matching on at least one first signal, except the common signal, in to-be-sent signals of the first base station according to the time-frequency resource information of the common signal.

With reference to the fourth, fifth, or sixth possible implementation manner of the eighth aspect, in a seventh possible implementation manner, the receiving module is further configured to, receive, on a time-frequency resource that is reserved for transmitting the common signal but is actually not used to transmit the common signal, any other signal or data, sent by the first base station, except the common signal.

According to a ninth aspect, user equipment UE is provided, including: a receiving module, configured to receive indication information sent by a base station, where the indication information is used to indicate a time-frequency resource occupied by a common signal that is sent by the base station when a sending condition of the common signal is met, and the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1; and a rate matching module, configured to perform rate matching according to the indication information received by the receiving module.

According to a tenth aspect, user equipment UE is provided and configured to receive a synchronization signal sent by a first cell by using a first base station to which the first cell belongs, where the first cell includes at least two nodes, the at least two nodes include a first node and at least one second node, and the UE includes: an acquiring module, configured to acquire a sequence initialization identifier of a synchronization signal, where the synchronization signal includes a primary synchronization signal PSS and/or a secondary synchronization signal SSS, and sequence initialization identifiers of synchronization signals of the at least two nodes are different; and a detecting module, configured to detect, according to the sequence initialization identifier that is of the synchronization signal and acquired by the acquiring module, the synchronization signal sent by the first base station.

With reference to the tenth aspect, in a first possible implementation manner, the synchronization signal of the at least one second node has the same sequence initialization identifier, and the sequence initialization identifier of the synchronization signal of the first node is different from the sequence initialization identifier of the synchronization signal of the at least one second node; or the sequence initialization identifiers of the synchronization signals of the at least two nodes are different from each other.

With reference to the tenth aspect or with reference to the first possible implementation manner of the tenth aspect, in a second possible implementation manner, the UE further includes: a first receiving module, configured to receive indication information sent by the first base station, where the indication information is used to indicate a cell identity of the first cell.

With reference to the tenth aspect or with reference to the first or second possible implementation manner of the tenth aspect, in a third possible implementation manner, the acquiring module includes: a receiving unit, configured to receive the sequence initialization identifier that is used by the first base station when generating the synchronization signal and sent by the first base station.

With reference to the tenth aspect or with reference to any possible implementation manner of the first to third possible implementation manners of the tenth aspect, in a fourth possible implementation manner, the sequence initialization identifier of the synchronization signal of the first node is the cell identity of the first cell.

With reference to the fourth possible implementation manner of the tenth aspect, in a fifth possible implementation manner, the first node is a node that continuously sends the synchronization signal, so that the user equipment UE first establishes synchronization with the first node in the first cell.

With reference to the tenth aspect or any possible implementation manner of the first to fifth possible implementation manners of the tenth aspect, in a sixth possible implementation manner, the detecting module is specifically configured to detect, according to the sequence initialization identifier of the synchronization signal, the synchronization signal that is sent by the first base station when a sending condition of the common signal is met.

With reference to the sixth possible implementation manner of the tenth aspect, in a seventh possible implementation manner, the UE further includes: a first sending module, configured to, before the acquiring module acquires the sequence initialization identifier of the synchronization signal, send request information to the first base station, where the request information is used to request the first base station to send the synchronization signal; and the detecting module is specifically configured to detect, according to the sequence initialization identifier of the synchronization signal, the synchronization signal sent by the first base station according to the request information sent by the first sending module.

With reference to the fifth or sixth possible implementation manner of the tenth aspect, in a seventh possible implementation manner, the UE further includes: a second receiving module, configured to, before the detecting module detects, according to the sequence initialization identifier of the synchronization signal, the synchronization signal that is sent by the first base station when the sending condition of the common signal is met, receive configuration information that is of the synchronization signal and sent by the first base station; and the detecting module is specifically configured to, detect, according to the sequence initialization identifier that is of the synchronization signal and acquired by the acquiring module and the configuration information that is of the synchronization signal and received by the second receiving module, the synchronization signal sent by the first base station according to the request information.

With reference to the seventh possible implementation manner of the tenth aspect, in an eighth possible implementation manner, the configuration information of the synchronization signal includes at least one of the following information: sending time infatuation of the synchronization signal, information about sending times of the synchronization signal, sending interval infatuation of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

Based on the foregoing technical solutions and according to the method for transmitting a common signal, the base station, and the user equipment that are provided in the embodiments of the present invention, the base station sends a common signal in a triggering mode, so that the common signal is sent more flexibly, thereby reducing an overhead during sending of the common signal, reducing a possibility of interference caused by the sending of the common signal to a neighboring cell, and improving user experience.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), Universal Mobile Telecommunications System (UMTS), a Worldwide Interoperability for Microwave Access (WiMAX) communications system, and the like.

It should also be understood that in the embodiments of the present invention, user equipment (UE) may be referred to as a terminal, a mobile station (MS), a mobile terminal, and the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

It should also be understood that in the embodiments of the present invention, a base station may be a base transceiver station (BTS) in GSM or CDMA, or may be a NodeB in WCDMA, or may be an evolved NodeB (eNB or e-NodeB) in LTE, which is not limited in the present invention.

Figure 1:
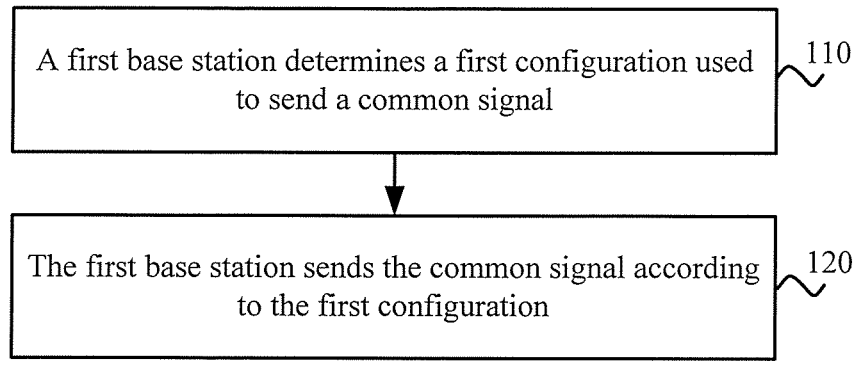
FIG. 1 is a schematic flowchart of a method for transmitting a common signal according to an embodiment of the present invention.

FIG. 1 shows a schematic flowchart of a method 100 for transmitting a common signal according to an embodiment of the present invention. The method may be executed by a first base station, and as shown in FIG. 1, the method 100 includes:

S110. The first base station determines a first configuration used to send a common signal.

S120. The first base station sends the common signal according to the first configuration.

Therefore, according to the method for transmitting a common signal in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Optionally, the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

Figure 2:
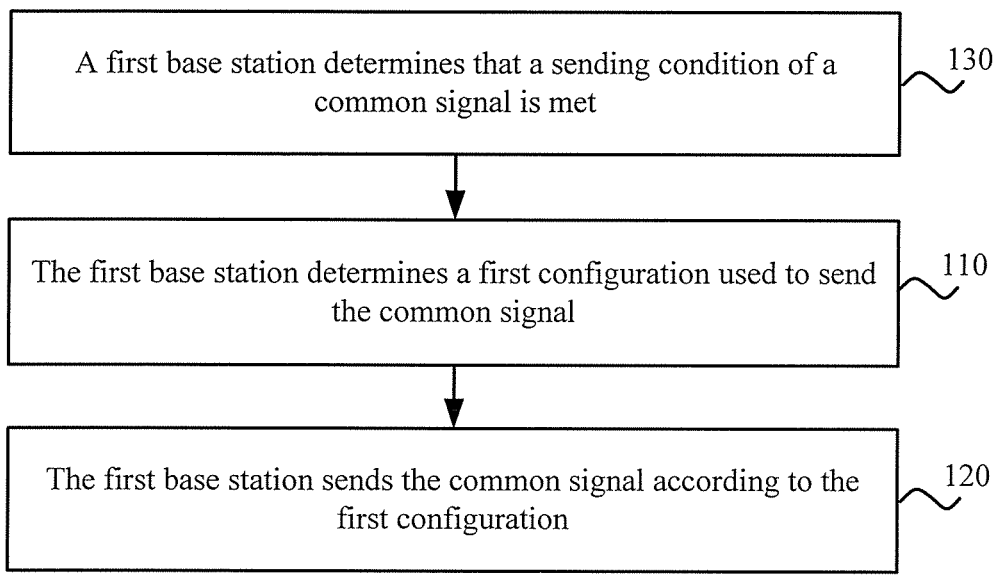
FIG. 2 is another schematic flowchart of a method for transmitting a common signal according to an embodiment of the present invention.

Optionally, the first base station may send the common signal in a triggering mode. Optionally, before S110, as shown in FIG. 2, the method 100 further includes:

S130. The first base station determines that a sending condition of the common signal is met.

Optionally, the first base station may determine, according to a UE-related event, that the sending condition of the common signal is met; and start to send one or more common signals of the PSS, the SSS, the PBCH, the CRS, the DS, and the SIB1, where the base station may send the common signal at a given interval within a period of time or may send the common signal only once. However, from a perspective of a relatively large time scale, the base station in this embodiment of the present invention does not continuously send the common signal, but sends the common signal only at a time point or continuously sends the common signal within a period of time, which is different from that a base station in the prior art continuously sends the common signal in a relatively large time scale. Optionally, the base station may periodically and continuously send the rest common signal in the PSS, the SSS, the PBCH, the CRS, the DS, and the SIB1, or may send the rest common signal in a triggering mode. This embodiment of the present invention is not limited thereto. Optionally, the base station may notify a UE, by using signaling, of a type of the common signal continuously sent and/or a type of the common signal sent in a triggering mode, so that the UE receives each common signal according to the signaling in a manner corresponding to a sending manner of each common signal. However, this embodiment of the present invention is not limited thereto.

In this embodiment of the present invention, a base station may control at least one cell, each cell may include at least one node, and the at least one cell and/or the at least one node may separately occupy different time-frequency resources. Correspondingly, a quantity of common signals sent by the base station may be one, for example, the base station sends one PSS. Optionally, when one cell controlled by the base station includes at least two nodes, the quantity of common signals sent by the base station may be multiple, and the multiple common signals are separately corresponding to one node in the at least two nodes. For example, the base station sends at least two PSSs, and the at least two PSSs separately occupy different time-frequency resources, so that UEs located on the at least two nodes corresponding to the at least two PSSs can receive the common signals separately on corresponding time-frequency resources, and perform synchronization with the nodes or perform further measurement on the nodes according to the common signals. However, this embodiment of the present invention is not limited thereto.

Optionally, the first base station may send the common signal by using a fixed first configuration; or may flexibly determine, according to a current network status, a first configuration used to send the common signal, and notify a UE or another base station of the first configuration, so that the UE or a UE served by the another base station that receives the first configuration can receive the common signal according to the first configuration. Optionally, as another embodiment, before S120, the method 100 further includes:

S135a. The first base station sends first configuration information of the common signal to a second base station, where the first configuration information is used to indicate the first configuration; and/or S135b. The first base station sends first configuration information of the common signal to user equipment UE, where the first configuration information is used to indicate the first configuration.

Optionally, the second base station may send the first configuration information of the common signal to UEs served by the second base station, where the first configuration information is used by these UEs to receive or detect the common signal, which is convenient for these UEs to perform a subsequent cell handover or cell selection.

Optionally, that the first base station sends first configuration information of the common signal to user equipment UE may be that the first base station sends configuration information of the common signal to the UE by using a third base station, where the configuration information is used by the UE to receive the common signal.

The third base station may be a base station that is connected to the first base station by using a core network, and the third base station may learn the configuration information by receiving a notification of the first base station or in another manner. The UE may be one or more UEs. However, this embodiment of the present invention is not limited thereto.

The sending condition of the common signal may include multiple triggering conditions. For example, the triggering condition may be receiving request information that is sent by the UE or the another base station and used to request the first base station to send the common signal; or the triggering condition may be receiving feedback information reported by the UE, for example, a hybrid automatic repeat request (HARQ) or a measurement report used to indicate that a channel state between the UE and the first base station is relatively poor. However, this embodiment of the present invention is not limited thereto. Optionally, as another embodiment, the sending condition of the common signal includes at least one of the following conditions:

condition one: the first base station receives first request information sent by a second base station, where the first request information is used to request the first base station to send the common signal;

condition two: the first base station receives second request information sent by a first UE, where the second request information is used to request the first base station to send the common signal; and condition three: the first base station receives a measurement report sent by a first UE, and a first parameter that is in the measurement report and used to indicate a channel state between the first UE and the first base station is lower than a preset threshold.

In condition one, before S110, the first base station may receive the first request information sent by the second base station, and determine, according to the first request information, that the sending condition of the common signal is met. The second base station may be connected to the first base station by using the core network. When the second base station receives request info nation that is sent by a UE served by the second base station and used to request the first base station to send the common signal; or the second base station receives feedback information sent by a UE served by the second base station, for example, a radio resource management (RRM) measurement result, and the RRM measurement result indicates that quality of a signal received by the UE from the second base station is relatively poor, so that it is determined that the first base station needs to send the common signal, the second base station may send the first request information to the first base station, so as to request the first base station to send the common signal, so that the UE can measure the common signal or for the UE to access the first base station. Further, the first request information may further be used to request the first base station to use specific configuration information to send the common signal, for example, a type of the sent common signal, a sending moment of the common signal, and sending times and intervals of the common signal. Correspondingly, the first base station may use the configuration information requested in the first request information to send the common signal. However, this embodiment of the present invention is not limited thereto.

In condition two, when the first UE needs to acquire some information about the first base station or the first UE needs to establish synchronization with a cell controlled by the first base station, the first UE may send the second request information to the first base station, so as to request the first base station to send the common signal; further, the second request information may further request another base station that is connected to the first base station by using the core network also to send the common signal. Optionally, the second request information may be used to request the first base station to use specific configuration information to send the common signal, for example, a type of the sent common signal, a sending moment of the common signal, and sending times and intervals of the common signal. Correspondingly, the first base station may use the configuration information requested in the second request information to send the common signal. Optionally, when the first base station does not use configuration information requested by the first UE to send the common signal, the first base station may send, to the first UE or multiple UEs including the first UE, the first configuration information used to indicate the first configuration of the common signal, so that the UE that receives the first configuration information can receive the common signal according to the first configuration information. Optionally, when the second request information may further request the first base station to send specific configuration information of the common signal to the first UE, correspondingly, the first base station may send the specific configuration information of the common signal to the first UE or the multiple UEs including the first UE. However, this embodiment of the present invention is not limited thereto.

In condition three, the measurement report may include a measurement result obtained after the first UE performs RRM measurement on a CRS or a channel state information reference signal (CSI-RS) of a serving cell of the first UE; may also include a result obtained after the first UE performs RRM measurement on a neighboring cell of the first UE; may further include a result obtained after the first UE performs RRM measurement on a neighboring base station of the first UE, where the RRM measurement result may include a result obtained after the first UE measures a reference signal received power (RSRP), reference signal received quality (RSRQ), and a received signal strength indicator (RSSI). However, this embodiment of the present invention is not limited thereto.

When the first base station finds that a first parameter that is in the measurement result and used to indicate a channel state between the first UE and the serving cell of the first UE is lower than a preset threshold and/or a second parameter that is in the measurement result and used to indicate a channel state between the first UE and the neighboring cell of the first UE is higher than another preset threshold, it indicates that the channel state between the first UE and the serving cell of the first UE is relatively poor and/or channel quality between the first UE and the neighboring cell of the first UE is relatively good, so that the first base station determines that the sending condition of the common signal is met, and uses the first configuration to send the common signal. Optionally, the first base station may notify the first UE of the first configuration of the common signal, so that the first UE receives the common signal according to the first configuration and performs synchronization again according to the common signal or acquires related information of a cell according to the common signal so as to perform further measurement. Optionally, when the measurement report indicates that a channel state between the first UE and the neighboring base station of the first UE is relatively good, the first base station may further send request information to the neighboring base station, so as to request the neighboring base station to send the common signal to the first UE, so that the first UE performs synchronization with the neighboring base station or performs further measurement. However, this embodiment of the present invention is not limited thereto.

Optionally, as another embodiment, when at least one condition of the foregoing three triggering conditions is met, before S120, the method 100 further includes:

S140a. When the first base station determines that the sending condition one of the common signal is met, the first base station sends first configuration information of the common signal to the second base station, where the first configuration information is used to indicate the first configuration; and/or S140b. When the first base station determines that the sending condition two or three of the common signal is met, the first base station sends first configuration information of the common signal to a second UE that includes at least the first UE, where the first configuration information is used to indicate the first configuration.

In S140a, the first base station may send the first configuration information to the second base station, and the second base station determines to send the first configuration information to which UEs that are served by the second base station. In S140b, the first base station may send the first configuration information only to the first UE or may further send the first configuration information to another UE in a cell in which the first UE is located. This embodiment of the present invention is not limited thereto.

The first base station may send the first configuration information to the second base station or the second UE in multiple manners. Optionally, the first base station may send physical layer signaling to the second base station or the second UE, where the physical layer signaling carries the first configuration information, for example, a physical downlink control channel (PDCCH) or an enhanced physical downlink control channel (ePDCCH). Optionally, the first base station may send higher layer signaling to the second UE or the second base station, where the higher layer signaling carries the first configuration information, for example, radio resource control (RRC) signaling Optionally, the first base station may further send at least one set of configuration information of the common signal to the second UE or the second base station by using higher layer signaling, and instruct, by using physical layer signaling, the second UE or the second base station to use which set of configuration information in the at least one set of configuration information to receive the common signal. The physical layer signaling or the higher layer signaling may be broadcast signaling or UE-specific signaling. However, this embodiment of the present invention is not limited thereto.

Optionally, the first base station may further send the configuration information of the common signal to the second UE in a cross-carrier or cross-cell manner, for example, the first base station may send a common signal of a secondary serving cell of the second UE and send configuration information of the common signal by using a primary serving cell of the second UE. In addition, optionally the primary serving cell and the secondary serving cell of the second UE may use different carrier types. However, this embodiment of the present invention is not limited thereto.

Optionally, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

The code resource information of the common signal may include scrambling code information of the common signal, for example, a sequence initialization identifier. The identification information of the common signal may include an index number of the common signal. However, this embodiment of the present invention is not limited thereto. Optionally, the first configuration may further include information about a sending manner of the common signal, for example, a diversity transmission manner or a random beamforming manner and information about a beam used during beamforming. When the common signal includes a PSS or an SSS, the configuration information of the common signal may further include whether only the PSS is sent, only the SSS is sent, or the like. However, this embodiment of the present invention is not limited thereto.

Optionally, as another embodiment, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes the scrambling code information of the common signal.

The sending time information of the common signal may be information about a subframe occupied by the common signal, and the sending time may be an absolute time or a relative time. For example, the sending time information of the common signal is the $N^{th}$ subframe or the $N^{th}$ valid downlink subframe or the $N^{th}$ valid subframe after the first base station sends the first subframe of the configuration information of the common signal, or the $M^{th}$ subframe or the $M^{th}$ valid downlink subframe or the $M^{th}$ valid subframe of a next radio frame, or the like. The sending times of the common signal may be one or more times. The sending interval information of the common signal may include one or more time intervals, and adjacent time intervals at which the first base station sends the common signal may be invariable or variable. For example, two adjacent time intervals at which the common signal is sent may progressively increase or decrease, or sending intervals of the common signal may be several long intervals and several short intervals that occur alternatively. The sending intervals of the common signal may have various different situations. However, the present invention is not limited thereto.

Optionally, the first base station and a UE side may also agree in advance on at least two patterns of the resource element (RE) occupied by the common signal, and the first base station may determine to currently use one pattern of the at least two patterns to send the common signal, and notify the second UE of information about the used pattern. However, this embodiment of the present invention is not limited thereto.

Optionally, partial information included in the first configuration may further be preset on the first base station and the UE side, for example, how many transmission time intervals (TTI) after which the first base station sends the common signal after receiving the second request information sent by the UE, or the sending times and sending intervals of the common signal. When the partial information is preset on the first base station and the UE side, the first base station may notify the first UE of rest information, except the preset partial configuration information, included in the first configuration, so that the first UE receives, according to the preset partial configuration information and the rest configuration information sent by the first base station, the common signal that is sent by the first base station when the sending condition of the common signal is met. However, this embodiment of the present invention is not limited thereto.

Optionally, the first base station may not transmit any other signal or data on a time-frequency resource used to send the common signal; and may perform rate matching according to information about the time-frequency resource. Correspondingly, as another embodiment, the method 100 further includes:

S145. The first base station performs rate matching on at least one first signal, except the common signal, in to-be-sent signals according to the time-frequency resource information of the common signal.

Specifically, when the first base station is mapping another signal or data, whether there is transmission of the common signal may be considered. In this way, the first base station does not map the another signal or data to the time-frequency resource used to send the common signal, that is, the first base station performs rate matching on the any other signal or data according to the time-frequency resource for sending the common signal; correspondingly, the UE may perform rate matching according to the time-frequency resource for sending the common signal. Optionally, when the first base station is mapping another signal or data, whether there is transmission of the common signal may also not be considered. The first base station may map the other signal or data to the time-frequency resource used to send the common signal. In this case, the first base station may remove the other signal or data and transmit only the common signal on the time-frequency resource; correspondingly, the UE may remove the received another signal or data on the time-frequency resource used to send the common signal. However, this embodiment of the present invention is not limited thereto.

Optionally, as another embodiment, the method 100 further includes:

S150. The first base station sends second configuration information to a third UE, where the second configuration information is used to indicate the time-frequency resource information, so that the third UE performs rate matching according to the second configuration information.

The third UE may be another UE except the second UE. Optionally, the second configuration information may be downlink control information (DCI) or RRC signaling. However, this embodiment of the present invention is not limited thereto.

Optionally, as another embodiment, before S110, the method 100 further includes:

S155. The first base station stops sending the common signal or sends the common signal by using a third configuration, where a common signal sending period corresponding to the third configuration is greater than a common signal sending period corresponding to the first configuration.

The first base station does not send the common signal before S110 or sends the common signal within a longer period. Therefore, when the UE needs to perform measurement or synchronization by using the common signal, the UE needs to trigger the first base station to send the common signal. However, this embodiment of the present invention is not limited thereto.

Optionally, as another embodiment, the first configuration is preset on the first base station; or In S110, that a first base station determines a first configuration used to send a common signal includes:

S111. The first base station selects the first configuration from multiple preset configurations.

The first configuration may be the only configuration that is preset on the first base station and used to send the common signal, or may be one of multiple configurations that are preset on the first base station and used to send the common signal. This embodiment of the present invention is not limited thereto.

Optionally, as another embodiment, the method 100 further includes:

S160. The first base station transmits any other signal or data except the common signal on a time-frequency resource that is reserved for transmitting the common signal but is actually not used to transmit the common signal.

Optionally, as another embodiment, the method 100 further includes:

S170. The first base station receives a radio resource management RRM measurement result sent by the second UE, where the RRM measurement result is obtained after the second UE performs RRM measurement on the common signal.

The second UE may include at least the first UE; after receiving the first configuration information sent by the first base station or the second base station or the third base station, the second UE may receive, according to the first configuration information, a common signal sent by the first base station in a triggering mode, and optionally, perform RRM measurement on the common signal. The second UE may further send the RRM measurement result to the first base station, so that the first base station can perform resource scheduling for the second UE according to the RRM measurement result. However, this embodiment of the present invention is not limited thereto.

In this embodiment of the present invention, the common signal sent by the first base station may occupy a time-frequency resource reserved for the common signal or may occupy another time-frequency resource. When the reserved time-frequency resource is not used to send the common signal, the reserved time-frequency resource may be used to send another signal or data except the common signal. However, this embodiment of the present invention is not limited thereto.

Therefore, according to the method for transmitting a common signal in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 3:
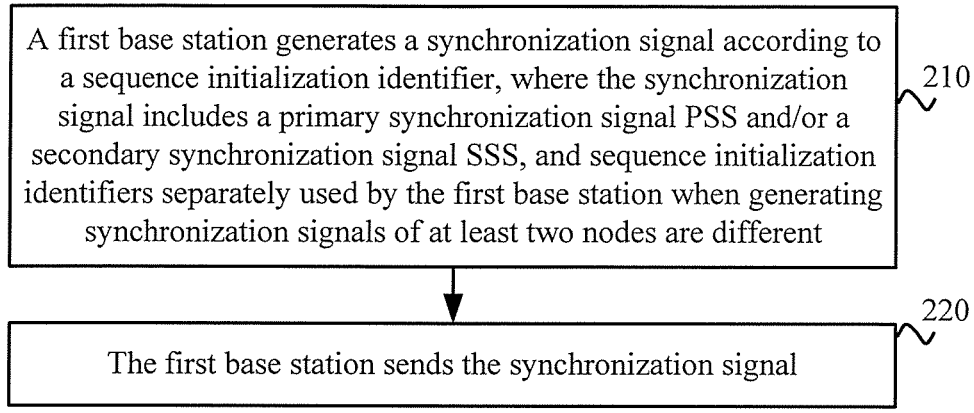
FIG. 3 is a schematic flowchart of a method for transmitting a common signal according to another embodiment of the present invention.

FIG. 3 shows a schematic flowchart of a method 200 for transmitting a common signal according to another embodiment of the present invention. The method may be executed by a first base station. The method 200 is used to send a synchronization signal to user equipment UE in a first cell that belongs to the first base station, the first cell includes at least two nodes, and the at least two nodes include a first node and at least one second node. As shown in FIG. 3, the method 200 includes:

S210. The first base station generates the synchronization signal according to a sequence initialization identifier, where the synchronization signal includes a primary synchronization signal PSS and/or a secondary synchronization signal SSS, and sequence initialization identifiers separately used by the first base station when generating synchronization signals of the at least two nodes are different.

S220. The first base station sends the synchronization signal.

The first base station may use any non-negative integer as the sequence initialization identifier of the synchronization signal, so that the synchronization signal is unbound from a cell identity. Therefore, according to the method for transmitting a common signal in this embodiment of the present invention, a synchronization signal is unbound from a cell identity, so that multiple nodes in a cell can send different synchronization signals to user equipment, and the user equipment can further distinguish between different nodes according to the synchronization signals and separately establish synchronization with the different nodes, thereby improving communications efficiency and user experience.

Optionally, the first base station may use a UE-specific sequence initialization identifier to generate a sequence of the synchronization signal. For example, the first base station may use a numerical value X1 as a sequence initialization identifier for generating a sequence corresponding to a PSS of the first node, and use a numerical value X2 as a sequence initialization identifier for generating a sequence corresponding to an SSS of the first node, where X1 and X2 depend on a user identifier or a device identifier of the UE, or X1 and X2 are any integers from 0 to 503. However, this embodiment of the present invention is not limited thereto.

The first base station may generate and send a synchronization signal of a node according to only one sequence initialization identifier, and the node may be any node of the first node and the at least one second node. Optionally, the first base station may separately generate and send synchronization signals of multiple nodes according to multiple sequence initialization identifiers, where the multiple nodes may be any nodes of the first node and the at least one second node, and a synchronization signal of each node in the multiple nodes may include only a PSS, may include only an SSS, or may include both a PSS and an SSS. Optionally, the sequence initialization identifiers separately used by the first base station when generating the synchronization signals of the multiple nodes may be different from each other, that is, sequence initialization identifiers used for generating synchronization signals of any two nodes in the multiple nodes are different. Optionally, when generating the synchronization signals of the multiple nodes, the first base station may use a same sequence initialization identifier for synchronization signals of some nodes and use different sequence initialization identifiers for synchronization signals of rest nodes. However, this embodiment of the present invention is not limited thereto.

Optionally, that sequence initialization identifiers separately used by the first base station when generating synchronization signals of the at least two nodes are different includes:

the same sequence initialization identifier is used by the first base station when generating the synchronization signal of the at least one second node, and the sequence initialization identifier used by the first base station when generating the synchronization signal of the first node is different from the sequence initialization identifier separately used by the first base station when generating the synchronization signal of the at least one second node; or the sequence initialization identifiers separately used by the first base station when generating the synchronization signals of the at least two nodes are different from each other.

Optionally, the first base station may further notify the first UE of a cell identity of the first cell, so that the first UE performs further measurement on the cell according to the cell identity. Correspondingly, as another embodiment, the method 200 further includes:

S230. The first base station sends indication information to first user equipment UE, where the indication information is used to indicate a cell identity of the first cell.

The first base station may send the cell identity to the first UE in multiple manners. Optionally, the first base station may send physical layer signaling to the first UE, for example, a PDCCH or an ePDCCH, where the physical layer signaling is used to indicate the cell identity. Optionally, the first base station may send higher layer signaling to the first UE, for example, RRC signaling, where the higher layer signaling is used to indicate the cell identity. Optionally, the physical layer signaling or the higher layer signaling may be broadcast signaling or UE-specific signaling. However, this embodiment of the present invention is not limited thereto.

Optionally, the first base station may further send the cell identity to the first UE in a cross-carrier or cross-cell manner, for example, the first base station sends a synchronization signal of a secondary serving cell of the first UE, and the first base station sends the cell identity by using a primary serving cell of the first UE. In addition, optionally the primary serving cell and the secondary serving cell of the first UE may use different carrier types. However, this embodiment of the present invention is not limited thereto.

Optionally, the first base station may further notify the first UE of the sequence initialization identifier used when generating the synchronization signal, so that the first UE can detect the synchronization signal according to the sequence initialization identifier, thereby avoiding that the first UE performs blind detection, and reducing complexity of the first UE. Correspondingly, as another embodiment, before S220, the method 200 further includes:

S240. The first base station sends the sequence initialization identifier of the synchronization signal to the first UE.

When the first base station sends at least two synchronization signals, the first base station may notify the first UE of sequence initialization identifiers separately used for the at least two synchronization signals, so that the first UE can use the corresponding sequence initialization identifiers to separately detect the at least two synchronization signals. However, this embodiment of the present invention is not limited thereto.

The first base station may send the sequence initialization identifier to the first UE in multiple manners. Optionally, the first base station may send physical layer signaling to the first UE, for example, a PDCCH or an ePDCCH, where the physical layer signaling is used to indicate the sequence initialization identifier of the synchronization signal. Optionally, the first base station may send higher layer signaling to the first UE, for example, RRC signaling, where the higher layer signaling is used to indicate the sequence initialization identifier of the synchronization signal. Optionally, the first base station may send at least two sequence initialization identifiers to the first UE by using higher layer signaling, and instruct, by using physical layer signaling, the first UE to use which one or which sequence initialization identifiers in the at least two sequence initialization identifiers to receive the synchronization signal. Optionally, the physical layer signaling or the higher layer signaling may be broadcast signaling or UE-specific signaling. However, this embodiment of the present invention is not limited thereto.

Optionally, the first base station may further send the sequence initialization identifier of the synchronization signal to the first UE in a cross-carrier or cross-cell manner, for example, the first base station sends a synchronization signal of a secondary serving cell of the first UE, and the first base station sends a sequence initialization identifier of the synchronization signal by using a primary serving cell of the first UE. In addition, optionally the primary serving cell and the secondary serving cell of the first UE may use different carrier types. However, this embodiment of the present invention is not limited thereto.

Optionally, when generating synchronization signals of multiple nodes, the first base station may use the cell identity of the first cell as sequence initialization identifiers of synchronization signals of some nodes in the multiple nodes, and use another non-negative integer except the cell identity as sequence initialization identifiers of synchronization signals of some other nodes. Correspondingly, as another embodiment, the sequence initialization identifier used by the first base station when generating the synchronization signal of the first node is the cell identity of the first cell.

Optionally, each node of the first node and the at least one second node may continuously send the synchronization signal in a relatively large time scale, or may send the synchronization signal in a triggering mode according to UE-related event. Specifically, it may be determined that a sending condition of the synchronization signal is met, and the synchronization signal is generated according to the sequence initialization identifier and sent. For a triggering condition of the synchronization signal, refer to the triggering condition in the foregoing embodiment. However, this embodiment of the present invention is not limited thereto.

Optionally, as another embodiment, the first node is a node that continuously sends the synchronization signal, so that the first UE first establishes synchronization with the first node in the first cell.

Figure 4:
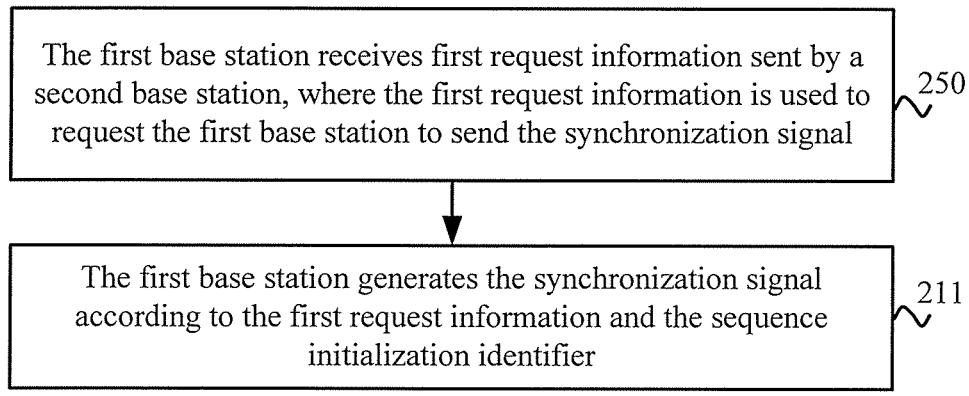
FIG. 4 is another schematic flowchart of a method for transmitting a common signal according to another embodiment of the present invention.

Optionally, as another embodiment, as shown in FIG. 4, before S210, the method 200 further includes:

S250. The first base station receives first request information sent by a second base station, where the first request information is used to request the first base station to send the synchronization signal.

Correspondingly, in S210, that the first base station generates the synchronization signal according to a sequence initialization identifier includes:

S211. The first base station generates the synchronization signal according to the first request information and the sequence initialization identifier.

Figure 5:
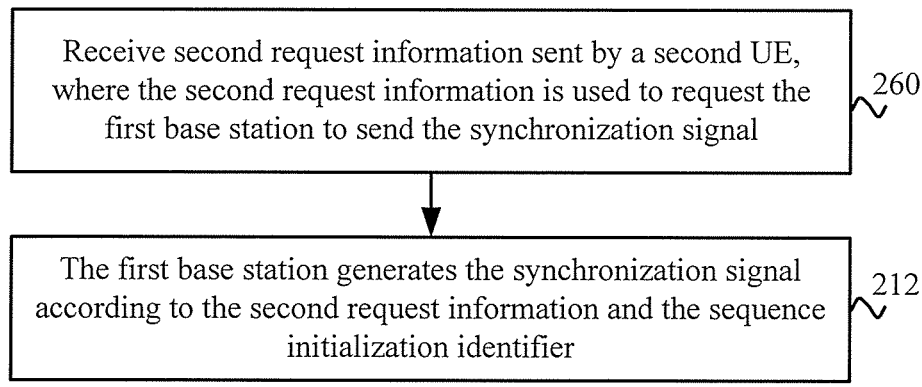
FIG. 5 is still another schematic flowchart of a method for transmitting a common signal according to another embodiment of the present invention.

Optionally, as another embodiment, as shown in FIG. 5, before S210, the method 200 further includes:

S260. Receive second request information sent by a second UE, where the second request information is used to request the first base station to send the synchronization signal.

Correspondingly, in S210, that the first base station generates the synchronization signal according to a sequence initialization identifier includes:

S212. The first base station generates the synchronization signal according to the second request information and the sequence initialization identifier.

Figure 6:
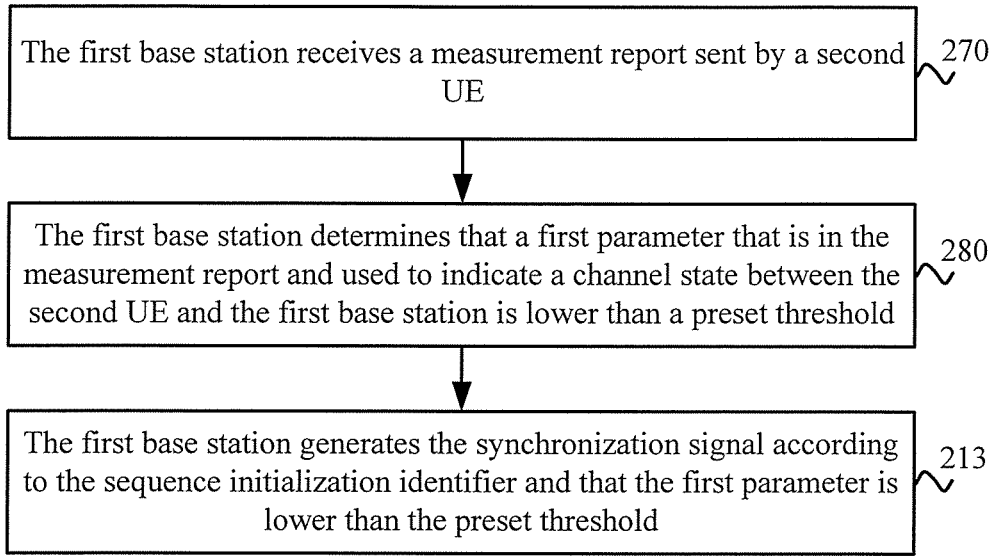
FIG. 6 is still another schematic flowchart of a method for transmitting a common signal according to another embodiment of the present invention.

Optionally, as another embodiment, as shown in FIG. 6, before S210, the method 200 further includes:

S270. The first base station receives a measurement report sent by the second UE.

S280. The first base station determines that a first parameter that is in the measurement report and used to indicate a channel state between the second UE and the first base station is lower than a preset threshold.

Correspondingly, in S210, that the first base station generates the synchronization signal according to a sequence initialization identifier includes:

S213. The first base station generates the synchronization signal according to the sequence initialization identifier and that the first parameter is lower than the preset threshold.

Optionally, when one or more nodes of the first node and the at least one second node send the synchronization signal in a triggering mode, the one or more nodes may use preset configuration information to send the synchronization signal, or may determine to-be-used configuration information according to a current status and notify the first UE of the configuration information, so that the first UE receives the synchronization signal according to the configuration information and the sequence initialization identifier. Correspondingly, as another embodiment, before S220, the method 200 further includes:

S290. The first base station sends configuration information of the synchronization signal to the first UE, where the configuration information is used by the first UE to detect the synchronization signal.

Optionally, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

For specific parameter information, refer to the foregoing embodiment. For brevity, details are not described herein again.

Therefore, according to the method for transmitting a common signal in this embodiment of the present invention, a synchronization signal is unbound from a cell identity, so that multiple nodes in a cell can send different synchronization signals to user equipment, and the user equipment can further distinguish between different nodes according to the synchronization signals and separately establish synchronization with the different nodes, thereby improving communications efficiency and user experience.

With reference to FIG. 1 to FIG. 6 and from a perspective of a base station, the foregoing describes in detail the method for transmitting a common signal according to this embodiment of the present invention; with reference to FIG. 7 to FIG. 10 and from a perspective of a UE, the following describes in detail a method for transmitting a common signal according to an embodiment of the present invention.

Figure 7:
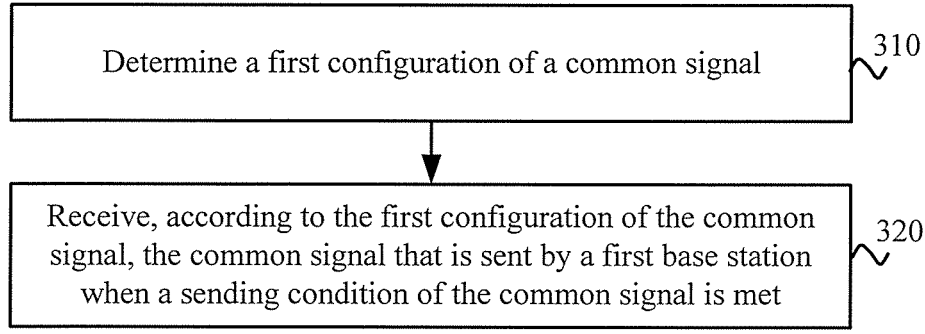
FIG. 7 is a schematic flowchart of a method for transmitting a common signal according to still another embodiment of the present invention.

FIG. 7 shows a schematic flowchart of a method 300 for transmitting a common signal according to still another embodiment of the present invention. The method 300 may be executed by user equipment UE, and as shown in FIG. 7, the method 300 includes:

S310. Determine a first configuration of a common signal.

S320. Receive, according to the first configuration of the common signal, the common signal that is sent by a first base station when a sending condition of the common signal is met.

Therefore, according to the method for transmitting a common signal in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Optionally, the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

Optionally, the UE may determine the first configuration of the common signal according to a preset condition, or may determine the first configuration of the common signal by receiving indication information sent by the first base station. However, this embodiment of the present invention is not limited thereto. Correspondingly, S310 that determine a first configuration of a common signal includes:

S311. Receive first configuration information sent by the first base station, where the first configuration information is used to indicate the first configuration.

Optionally, when the UE sends, to the first base station, first request information used to request the first base station to send the common signal, and configuration information that the first base station sends the common signal according to the first request information is preset on the UE and on the first base station side, the UE may determine the first configuration according to the preset condition. Optionally, the UE may request, in the first request information, configuration information used to send the common signal, and determine the first configuration according to the first request information. Optionally, the UE may determine the first configuration by receiving the indication information that is sent by the first base station and used to indicate the first configuration. Optionally, when a serving base station of the UE is a second base station, and the second base station sends, to the first base station, second request information used to request the first base station to send the common signal, the UE may further determine the first configuration by receiving indication information that is sent by the first base station by using the second base station and used to indicate the first configuration. However, this embodiment of the present invention is not limited thereto.

Optionally, S310 that determine a first configuration of a common signal includes:

S311. Receive first configuration information sent by the first base station, where the first configuration information is used to indicate the first configuration.

Optionally, the UE may receive physical layer signaling sent by the first base station, for example, a PDCCH or an ePDCCH, where the physical layer signaling carries the first configuration information. Optionally, the UE may receive higher layer signaling sent by the first base station, for example, RRC signaling, where the higher layer signaling carries the first configuration information. Optionally, the UE may receive higher layer signaling sent by the first base station and receive physical layer signaling sent by the first base station, where the higher layer signaling indicates at least one set of configuration information of the common signal, and the physical layer signaling is used to instruct the UE to use which set of configuration information in the at least one set of configuration information to receive the common signal. Optionally, the physical layer signaling or the higher layer signaling may be broadcast signaling or UE-specific signaling. However, this embodiment of the present invention is not limited thereto.

Optionally, the UE may further receive the first configuration information sent by the first base station in a cross-carrier or cross-cell manner, for example, the first base station sends a common signal of a secondary serving cell of the UE, and the first base station sends a first configuration of the common signal by using a primary serving cell of the UE. In addition, optionally the primary serving cell and the secondary serving cell of the UE may use different carrier types. However, this embodiment of the present invention is not limited thereto.

Optionally, as another embodiment, the sending condition of the common signal includes at least one of the following conditions:

condition one: the first base station receives first request information sent by a second base station, where the first request information is used to request the first base station to send the common signal;

condition two: the first base station receives second request information sent by a second UE, where the second request information is used to request the first base station to send the common signal; and condition three: the first base station receives a measurement report sent by a second UE, and a first parameter that is in the measurement report and used to indicate a channel state between the second UE and the first base station is lower than a preset threshold.

The second UE may be the UE or may be another UE except the UE. However, this embodiment of the present invention is not limited thereto.

Optionally, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

Optionally, as another embodiment, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

Optionally, as another embodiment, the method 300 further includes:

S340. Perform rate matching on at least one first signal, except the common signal, in to-be-sent signals of the first base station according to time-frequency resource information of the common signal.

Optionally, as another embodiment, the method 300 further includes:

S350. Receive, on a time-frequency resource that is reserved for transmitting the common signal but is actually not used to transmit the common signal, any other signal or data, sent by the first base station, except the common signal.

Optionally, as another embodiment, the method 300 further includes:

S360. Perform radio resource management RRM measurement on the common signal sent by the first base station.

S370. Send a result of the RRM measurement to the first base station.

Therefore, according to the method for transmitting a common signal in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 8:
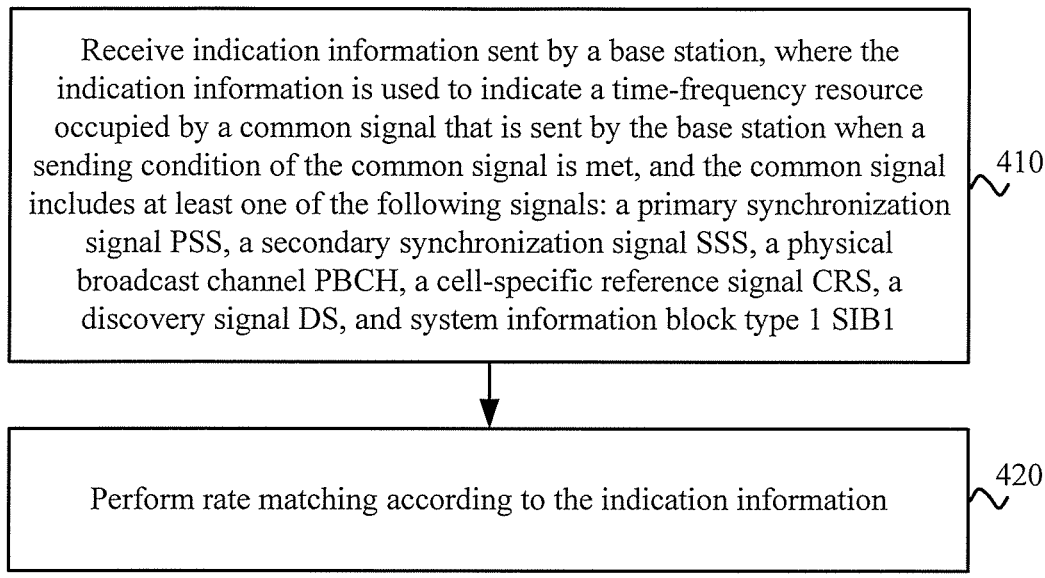
FIG. 8 is a schematic flowchart of a method for transmitting a common signal according to still another embodiment of the present invention.

FIG. 8 shows a schematic flowchart of a method 400 for transmitting a common signal according to still another embodiment of the present invention. The method may be executed by a UE, and as shown in FIG. 8, the method 400 includes:

S410. Receive indication information sent by a base station, where the indication information is used to indicate a time-frequency resource occupied by a common signal that is sent by the base station when a sending condition of the common signal is met, and the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

S420. Perform rate matching according to the indication information.

Therefore, according to the method for transmitting a common signal in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 9:
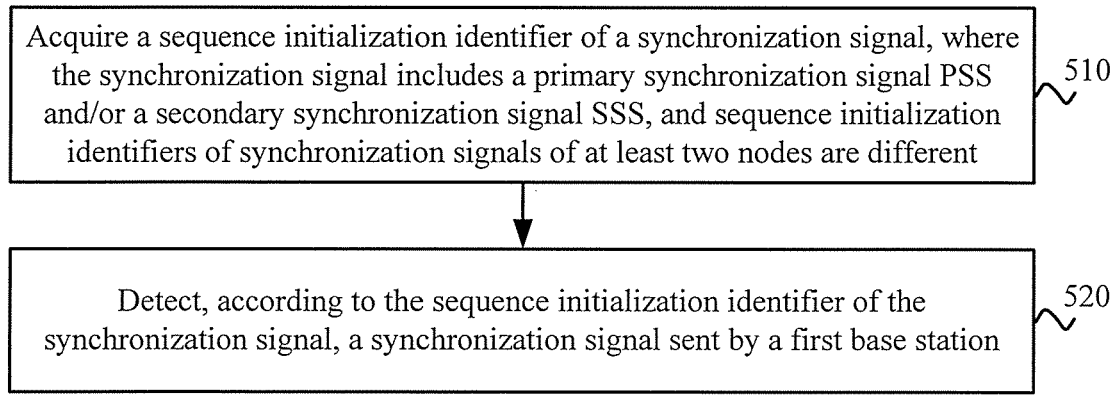
FIG. 9 is a schematic flowchart of a method for transmitting a common signal according to still another embodiment of the present invention.

FIG. 9 shows a schematic flowchart of a method 500 for transmitting a common signal according to still another embodiment of the present invention. The method may be executed by a UE that is used to receive a synchronization signal sent by a first cell by using a first base station to which the first cell belongs, the first cell includes at least two nodes, and the at least two nodes include a first node and at least one second node. As shown in FIG. 9, the method 500 includes:

S510. Acquire a sequence initialization identifier of a synchronization signal, where the synchronization signal includes a primary synchronization signal PSS and/or a secondary synchronization signal SSS, and sequence initialization identifiers of synchronization signals of the at least two nodes are different.

S520. Detect, according to the sequence initialization identifier of the synchronization signal, the synchronization signal sent by the first base station.

Therefore, according to the method for transmitting a common signal in this embodiment of the present invention, a synchronization signal is unbound from a cell identity, so that multiple nodes in a cell can send different synchronization signals to user equipment, and the user equipment can further distinguish between different nodes according to the synchronization signals and separately establish synchronization with the different nodes, thereby improving communications efficiency and user experience.

The UE may acquire a sequence initialization identifier used for a synchronization signal of a node of the first node and the at least one second node, and receive the synchronization signal according to the sequence initialization identifier. Optionally, the UE may acquire sequence initialization identifiers used for synchronization signals of multiple nodes of the first node and the at least one second node, and receive the corresponding synchronization signals according to the sequence initialization identifiers. However, this embodiment of the present invention is not limited thereto.

Optionally, the synchronization signal of the at least one second node has the same sequence initialization identifier, and the sequence initialization identifier of the synchronization signal of the first node is different from the sequence initialization identifier of the synchronization signal of the at least one second node; or the sequence initialization identifiers of the synchronization signals of the at least two nodes are different from each other.

Optionally, as another embodiment, the method 500 further includes:

S530. Receive indication information sent by the first base station, where the indication information is used to indicate a cell identity of the first cell.

Optionally, the UE may acquire the sequence initialization identifier of the synchronization signal according to a preset condition, or the UE may directly receive the sequence initialization identifier that is of the synchronization signal and sent by the first base station; when a serving base station of the UE is a second base station, the UE may further receive the sequence initialization identifier that is of the synchronization signal and sent by the first base station by using the second base station. This embodiment of the present invention is not limited thereto. Correspondingly, S510 that acquire a sequence initialization identifier of a synchronization signal includes:

S511. Receive the sequence initialization identifier that is of the synchronization signal and sent by the first base station.

Optionally, as another embodiment, the sequence initialization identifier of the synchronization signal of the first node is the cell identity of the first cell.

Optionally, as another embodiment, the first node is a node that continuously sends the synchronization signal, so that the user equipment UE first establishes synchronization with the first node in the first cell.

Optionally, the UE may also receive the common signal sent by the first base station in a triggering mode; correspondingly, as another embodiment, S520 that detect, according to the sequence initialization identifier of the synchronization signal, the synchronization signal sent by the first base station includes:

S520a. Detect, according to the sequence initialization identifier of the synchronization signal, the synchronization signal that is sent by the first base station when a sending condition of the common signal is met.

Optionally, the sending condition of the synchronization signal includes at least one of the following conditions:

condition one: the first base station receives first request information sent by a second base station, where the first request information is used to request the first base station to send the synchronization signal;

condition two: the first base station receives second request information sent by a second UE, where the second request information is used to request the first base station to send the synchronization signal; and condition three: the first base station receives a measurement report sent by a second UE, and a first parameter that is in the measurement report and used to indicate a channel state between the second UE and the first base station is lower than a preset threshold.

The second UE may be the UE or may be another UE except the UE. However, this embodiment of the present invention is not limited thereto.

Figure 10:
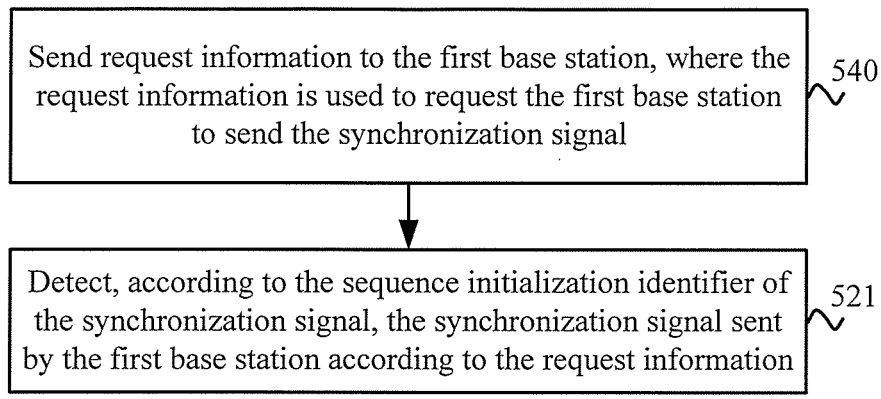
FIG. 10 is another schematic flowchart of a method for transmitting a common signal according to still another embodiment of the present invention.

Optionally, as another embodiment, as shown in FIG. 10, before S510, the method 500 includes:

S540. Send request information to the first base station, where the request information is used to request the first base station to send the synchronization signal.

Correspondingly, S520a that detect, according to the sequence initialization identifier of the synchronization signal, the synchronization signal that is sent by the first base station when a sending condition of the common signal is met includes:

S521. Detect, according to the sequence initialization identifier of the synchronization signal, the synchronization signal sent by the first base station according to the request information.

Optionally, as another embodiment, before S520a, the method 500 further includes:

S550. Receive configuration information that is of the synchronization signal and sent by the first base station.

Correspondingly, S521 that detect, according to the sequence initialization identifier of the synchronization signal, the synchronization signal sent by the first base station according to the request information includes:

S521b. Detect, according to the sequence initialization identifier of the synchronization signal and the configuration information of the synchronization signal, the synchronization signal sent by the first base station according to the request information.

Optionally, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

Therefore, according to the method for transmitting a common signal in this embodiment of the present invention, a synchronization signal is unbound from a cell identity, so that multiple nodes in a cell can send different synchronization signals to user equipment, and the user equipment can further distinguish between different nodes according to the synchronization signals and separately establish synchronization with the different nodes, thereby improving communications efficiency and user experience.

It should be understood that a size of a sequence number in the foregoing processes does not indicate an execution sequence, and an execution sequence of each process shall be determined by its function and internal logic, and shall not be construed as any limitation on an implementation process of this embodiment of the present invention.

With reference to FIG. 1 to FIG. 10, the foregoing describes in detail the method for transmitting a common signal according to an embodiment of the present invention; with reference to FIG. 11 to FIG. 25, the following describes a base station and user equipment according to an embodiment of the present invention.

Figure 11:
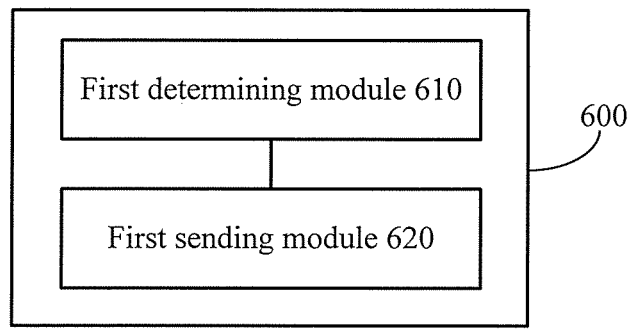
FIG. 11 is a schematic block diagram of a base station according to an embodiment of the present invention.

FIG. 11 shows a schematic block diagram of a base station 600 according to an embodiment of the present invention. As shown in FIG. 11, the base station 600 includes:

a first determining module 610, configured to determine a first configuration used to send a common signal; and a first sending module 620, configured to send the common signal according to the first configuration determined by the first determining module 610.

Therefore, the base station in this embodiment of the present invention sends a common signal in a triggering mode, so that the common signal is sent more flexibly, thereby reducing an overhead during sending of the common signal, reducing a possibility of interference caused by the sending of the common signal to a neighboring cell, and improving user experience.

The common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

Optionally, the base station 600 further includes:

a second determining module 630, configured to, before the first determining module 610 determines the first configuration used to send the common signal, determine that a sending condition of the common signal is met.

Optionally, as another embodiment, the base station 600 further includes:

a second sending module 640, configured to, before the first sending module 620 sends the common signal according to the first configuration, send first configuration information of the common signal to a second base station, where the first configuration information is used to indicate the first configuration; and/or a third sending module 650, configured to, before the first sending module 620 sends the common signal according to the first configuration, send first configuration information of the common signal to user equipment UE, where the first configuration information is used to indicate the first configuration.

Optionally, as another embodiment, the sending condition of the common signal includes at least one of the following conditions:

condition one: the base station receives first request information sent by a second base station, where the first request information is used to request the base station to send the common signal;

condition two: the base station receives second request information sent by a first UE, where the second request information is used to request the base station to send the common signal; and condition three: the base station receives a measurement report sent by a first UE, and a first parameter that is in the measurement report and used to indicate a channel state between the first UE and the base station is lower than a preset threshold.

Figure 12:
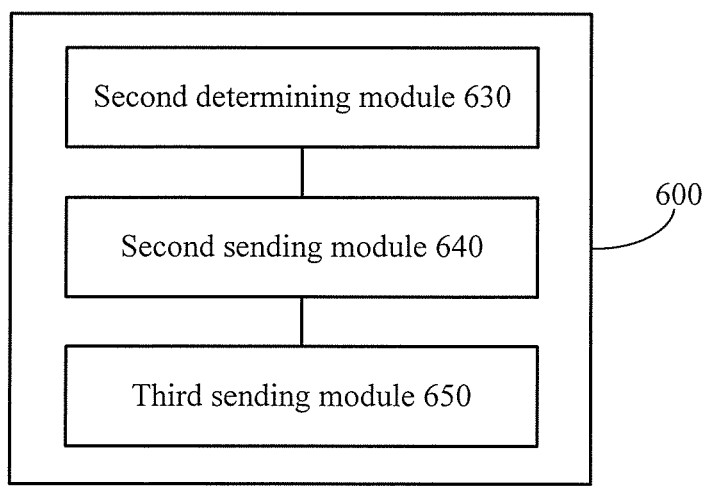
FIG. 12 is another schematic block diagram of a base station according to an embodiment of the present invention.

Optionally, as another embodiment and as shown in FIG. 12, the base station 600 further includes:

a second sending module 640, configured to, when the second determining module 630 determines that the sending condition one of the common signal is met, and before the first sending module 620 sends the common signal according to the first configuration, send first configuration information of the common signal to the second base station, where the first configuration information is used to indicate the first configuration; and/or a third sending module 650, configured to, when the second determining module 630 determines that the sending condition two or three of the common signal is met, and before the first sending module 620 sends the common signal according to the first configuration, send first configuration information of the common signal to a second UE that includes at least the first UE, where the first configuration information is used to indicate the first configuration.

Optionally, as another embodiment, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

Optionally, as another embodiment, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

Optionally, as another embodiment, the base station 600 further includes:

a rate matching module 660, configured to perform rate matching on at least one first signal, except the common signal, in to-be-sent signals according to the time-frequency resource information of the common signal.

Optionally, as another embodiment, the base station 600 further includes:

a fourth sending module 670, configured to send second configuration information to a third UE, where the second configuration information is used to indicate the time-frequency resource information, so that the third UE performs rate matching according to the second configuration information.

Optionally, as another embodiment, the first sending module 620 is further configured to, before the second determining module 630 determines that the sending condition of the common signal is met, stop sending the common signal or send the common signal by using a third configuration, where a common signal sending period corresponding to the third configuration is greater than a common signal sending period corresponding to the first configuration.

Optionally, as another embodiment, the first configuration is preset on the first base station; or the first determining module 610 is specifically configured to select the first configuration from multiple preset configurations.

Optionally, as another embodiment, the first sending module 620 is further configured to, send any other signal or data except the common signal on a time-frequency resource that is reserved for transmitting the common signal but is actually not used to transmit the common signal.

The base station 600 according to this embodiment of the present invention may be corresponding to a first base station in a method for transmitting a common signal according to an embodiment of the present invention, and the foregoing and other operations and/or functions of modules in the base station 600 are separately intended to implement corresponding processes of methods in FIG. 1 and FIG. 2; for brevity, details are not described herein again.

Therefore, the base station in this embodiment of the present invention sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 13:
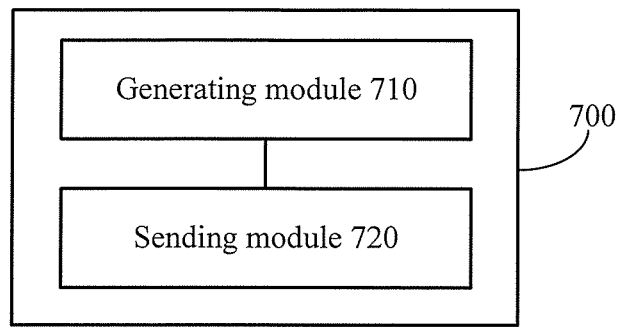
FIG. 13 is a schematic block diagram of a base station according to another embodiment of the present invention.

FIG. 13 shows a schematic block diagram of a base station 700 according to another embodiment of the present invention, where the base station 700 is used to send a synchronization signal to user equipment UE in a first cell that belongs to the base station 700, the first cell includes at least two nodes, and the at least two nodes include a first node and at least one second node. As shown in FIG. 13, the base station 700 includes:

a generating module 710, configured to generate the synchronization signal according to a sequence initialization identifier, where the synchronization signal includes a primary synchronization signal PSS and/or a secondary synchronization signal SSS, sequence initialization identifiers separately used by the generating module 710 when generating synchronization signals of the at least two nodes are different, and the first cell belongs to the base station; and a sending module 720, configured to send the synchronization signal generated by the generating module 710.

Therefore, the base station in this embodiment of the present invention unbinds a synchronization signal from a cell identity, so that multiple nodes in a cell can send different synchronization signals to user equipment, and the user equipment can further distinguish between different nodes according to the synchronization signals and separately establish synchronization with the different nodes, thereby improving communications efficiency and user experience.

Optionally, that sequence initialization identifiers separately used by the generating module 710 when generating synchronization signals of the at least two nodes are different includes:

the same sequence initialization identifier is used by the generating module 710 when generating the synchronization signal of the at least one second node, and the sequence initialization identifier used by the generating module 710 when generating the synchronization signal of the first node is different from the sequence initialization identifier separately used by the generating module 710 when generating the synchronization signal of the at least one second node; or the sequence initialization identifiers separately used by the generating module 710 when generating the synchronization signals of the at least two nodes are different from each other.

Optionally, as another embodiment, the sending module 720 is further configured to send indication information to first user equipment UE, where the indication information is used to indicate a cell identity of the first cell.

Optionally, as another embodiment, the sending module 720 is further configured to, before the synchronization signal is sent, send, to the first UE, the sequence initialization identifier used by the first base station when generating the synchronization signal.

Optionally, as another embodiment, the sequence initialization identifier used by the generating module 710 when generating the synchronization signal of the first node is the cell identity of the first cell.

Optionally, as another embodiment, the first node is a node that continuously sends the synchronization signal, so that the first UE first establishes synchronization with the first node in the first cell.

Figure 14:
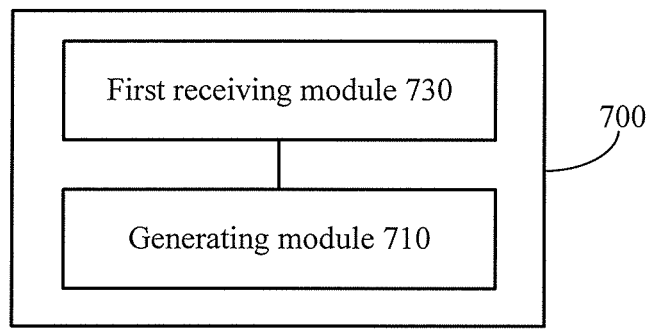
FIG. 14 is another schematic block diagram of a base station according to another embodiment of the present invention.

Optionally, as another embodiment and as shown in FIG. 14, the base station 700 further includes:

a first receiving module 730, configured to, before the generating module 710 generates the synchronization signal according to the sequence initialization identifier, receive first request information sent by a second base station, where the first request information is used to request the base station to send the synchronization signal; and correspondingly, the generating module 710 is specifically configured to generate the synchronization signal according to the first request information received by the first receiving module 730 and the sequence initialization identifier.

Optionally, as another embodiment, the base station 700 further includes:

a second receiving module 740, configured to, before the generating module 710 generates the synchronization signal according to the sequence initialization identifier, receive second request information sent by a second UE, where the second request information is used to request the base station to send the synchronization signal; and correspondingly, the generating module 710 is specifically configured to generate the synchronization signal according to the second request information received by the second receiving module 740 and the sequence initialization identifier.

Figure 15:
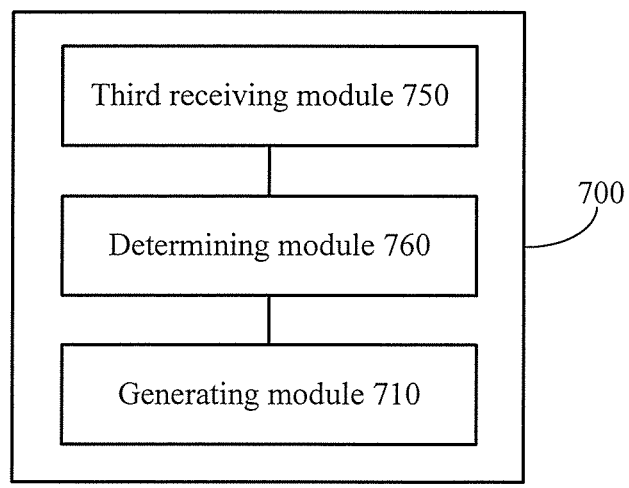
FIG. 15 is still another schematic block diagram of a base station according to another embodiment of the present invention.

Optionally, as another embodiment and as shown in FIG. 15, the base station 700 further includes:

a third receiving module 750, configured to, before the generating module 710 generates the synchronization signal according to the sequence initialization identifier, receive a measurement report sent by a second UE; and a determining module 760, configured to determine that a first parameter that is in the measurement report received by the third receiving module 750 and is used to indicate a channel state between the second UE and the base station is lower than a preset threshold; and correspondingly, the generating module 710 is specifically configured to generate the synchronization signal according to the sequence initialization identifier and that the first parameter is lower than the preset threshold, which is determined by the determining module 760.

Optionally, as another embodiment, the sending module 720 is further configured to, before the synchronization signal is sent, send configuration information of the synchronization signal to the first UE, where the configuration information is used by the first UE to detect the synchronization signal.

Optionally, as another embodiment, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

The base station 700 according to this embodiment of the present invention may be corresponding to a first base station in a method for transmitting a common signal according to an embodiment of the present invention, and the foregoing and other operations and/or functions of modules in the base station 700 are separately intended to implement corresponding processes of methods in FIG. 3 to FIG. 6; for brevity, details are not described herein again.

Therefore, the base station in this embodiment of the present invention unbinds a synchronization signal from a cell identity, so that multiple nodes in a cell can send different synchronization signals to user equipment, and the user equipment can further distinguish between different nodes according to the synchronization signals and separately establish synchronization with the different nodes, thereby improving communications efficiency and user experience.

With reference to FIG. 13 to FIG. 15, the foregoing describes in detail the base station according to this embodiment of the present invention; with reference to FIG. 16 to FIG. 20, the following describes user equipment according to an embodiment of the present invention.

Figure 16:
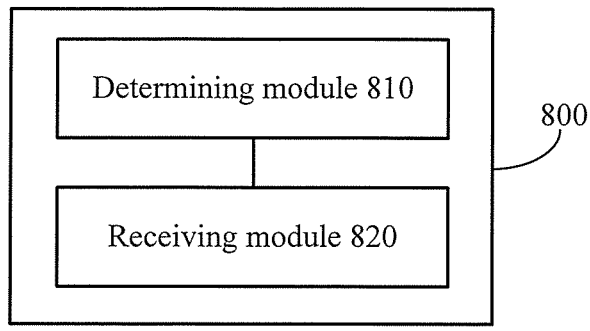
FIG. 16 is a schematic block diagram of user equipment according to an embodiment of the present invention.

FIG. 16 shows a schematic block diagram of user equipment UE 800 according to an embodiment of the present invention. As shown in FIG. 16, the UE 800 includes:

a determining module 810, configured to determine a first configuration of a common signal; and a receiving module 820, configured to receive, according to the first configuration that is of the common signal and determined by the determining module 810, the common signal that is sent by a first base station when a sending condition of the common signal is met.

Therefore, according to the user equipment in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Optionally, the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

Optionally, as another embodiment, the determining module 810 includes:

a receiving unit 811, configured to receive first configuration information sent by the first base station, where the first configuration information is used to indicate the first configuration.

Optionally, as another embodiment, the sending condition of the common signal includes at least one of the following conditions:

condition one: the first base station receives first request information sent by a second base station, where the first request information is used to request the first base station to send the common signal;

condition two: the first base station receives second request information sent by a second UE, where the second request information is used to request the first base station to send the common signal; and condition three: the first base station receives a measurement report sent by a second UE, and a first parameter that is in the measurement report and used to indicate a channel state between the second UE and the first base station is lower than a preset threshold.

Optionally, as another embodiment, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

Optionally, as another embodiment, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

Optionally, as another embodiment, the UE 800 further includes:

a rate matching module 830, configured to perform rate matching on at least one first signal, except the common signal, in to-be-sent signals of the first base station according to the time-frequency resource information of the common signal.

Optionally, as another embodiment, the receiving module 820 is further configured to, receive, on a time-frequency resource that is reserved for transmitting the common signal but is actually not used to transmit the common signal, any other signal or data, sent by the first base station, except the common signal.

The user equipment 800 according to this embodiment of the present invention may be corresponding to user equipment in a method for transmitting a common signal according to an embodiment of the present invention, and the foregoing and other operations and/or functions of modules in the user equipment 800 are separately intended to implement a corresponding process of the method in FIG. 7; for brevity, details are not described herein again.

Therefore, according to the user equipment in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 17:
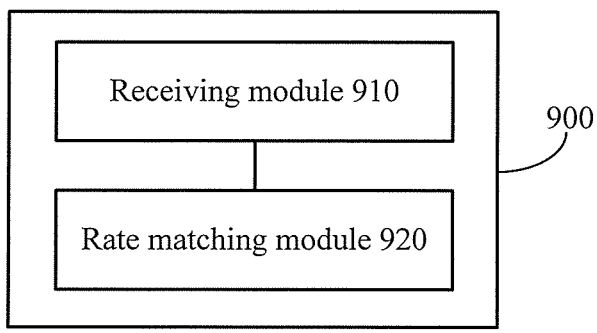
FIG. 17 is a schematic block diagram of user equipment according to another embodiment of the present invention.

FIG. 17 shows a schematic block diagram of user equipment UE 900 according to another embodiment of the present invention. As shown in FIG. 17, the UE 900 includes:

a receiving module 910, configured to receive indication information sent by a base station, where the indication information is used to indicate a time-frequency resource occupied by a common signal that is sent by the base station when a sending condition of the common signal is met, and the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1; and a rate matching module 920, configured to perform rate matching according to the indication information received by the receiving module.

The user equipment 900 according to this embodiment of the present invention may be corresponding to a third user equipment in a method for transmitting a common signal according to an embodiment of the present invention, and the foregoing and other operations and/or functions of modules in the user equipment 900 are separately intended to implement a corresponding process of the method in FIG. 8; for brevity, details are not described herein again.

Therefore, according to the user equipment in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 18:
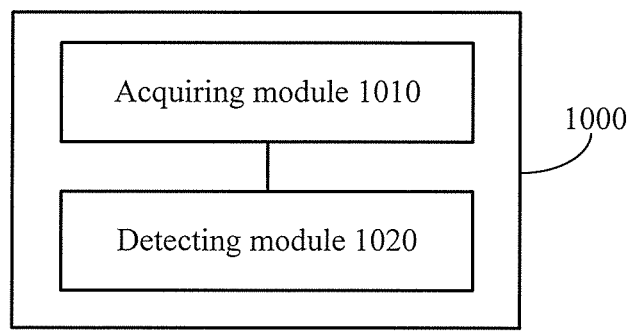
FIG. 18 is a schematic block diagram of user equipment according to still another embodiment of the present invention.

FIG. 18 shows a schematic block diagram of user equipment UE 1000 according to still another embodiment of the present invention, where the user equipment 1000 is used to receive a synchronization signal sent by a first cell by using a first base station to which the first cell belongs, the first cell includes at least two nodes, and the at least two nodes include a first node and at least one second node. As shown in FIG. 18, the UE 1000 includes:

an acquiring module 1010, configured to acquire a sequence initialization identifier of a synchronization signal, where the synchronization signal includes a primary synchronization signal PSS and/or a secondary synchronization signal SSS, and sequence initialization identifiers of synchronization signals of the at least two nodes are different; and a detecting module 1020, configured to detect, according to the sequence initialization identifier that is of the synchronization signal and acquired by the acquiring module 1010, the synchronization signal sent by the first base station.

Therefore, according to the user equipment in this embodiment of the present invention, a synchronization signal is unbound from a cell identity, so that multiple nodes in a cell can send different synchronization signals to the user equipment, and the user equipment can further distinguish between different nodes according to the synchronization signals and separately establish synchronization with the different nodes, thereby improving communications efficiency and user experience.

Optionally, the synchronization signal of the at least one second node has the same sequence initialization identifier, and the sequence initialization identifier of the synchronization signal of the first node is different from the sequence initialization identifier of the synchronization signal of the at least one second node; or the sequence initialization identifiers of the synchronization signals of the at least two nodes are different from each other.

Optionally, as another embodiment, the UE 1000 further includes:

a first receiving module 1030, configured to receive indication information sent by the first base station, where the indication information is used to indicate a cell identity of the first cell.

Optionally, as another embodiment, the acquiring module 1010 includes:

a receiving unit 1011, configured to receive the sequence initialization identifier that is of the synchronization signal and sent by the first base station.

Optionally, as another embodiment, the sequence initialization identifier of the synchronization signal of the first node is the cell identity of the first cell.

Optionally, as another embodiment, the first node is a node that continuously sends the synchronization signal, so that the user equipment UE first establishes synchronization with the first node in the first cell.

Optionally, as another embodiment, the detecting module 1020 is specifically configured to detect, according to the sequence initialization identifier of the synchronization signal, the synchronization signal that is sent by the first base station when a sending condition of a common signal is met.

Figure 19:
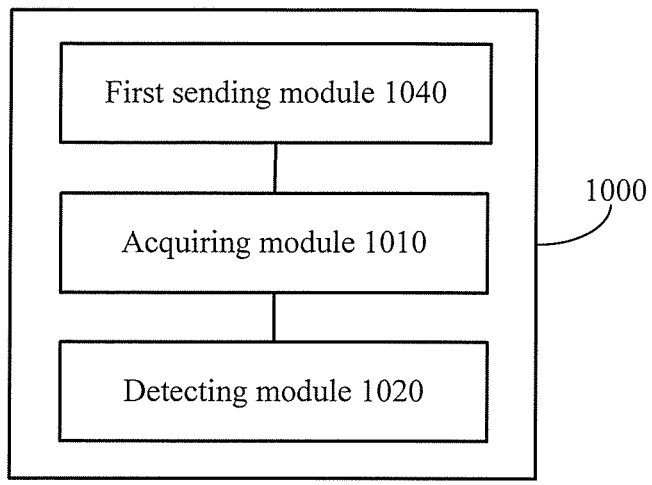
FIG. 19 is another schematic block diagram of user equipment according to still another embodiment of the present invention.

Optionally, as another embodiment and as shown in FIG. 19, the UE 1000 further includes:

a first sending module 1040, configured to, before the acquiring module 1010 acquires the sequence initialization identifier of the synchronization signal, send request information to the first base station, where the request information is used to request the first base station to send the synchronization signal; and correspondingly, the detecting module 1020 is specifically configured to detect, according to the sequence initialization identifier of the synchronization signal, the synchronization signal sent by the first base station according to the request information sent by the first sending module 1040.

Figure 20:
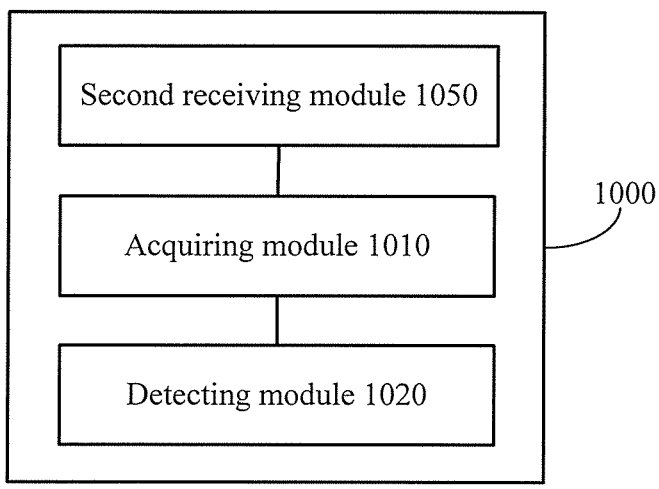
FIG. 20 is still another schematic block diagram of user equipment according to still another embodiment of the present invention.

Optionally, as another embodiment and as shown in FIG. 20, the UE 1000 further includes:

a second receiving module 1050, configured to, before the detecting module 1020 detects, according to the sequence initialization identifier of the synchronization signal, the synchronization signal that is sent by the first base station when the sending condition of the common signal is met, receive configuration information that is of the synchronization signal and sent by the first base station; and correspondingly, the detecting module 1020 is specifically configured to, detect, according to the sequence initialization identifier that is of the synchronization signal and acquired by the acquiring module 1010 and the configuration information that is of the synchronization signal and received by the second receiving module 1050, the synchronization signal sent by the first base station according to the request information.

Optionally, as another embodiment, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

The user equipment 1000 according to this embodiment of the present invention may be corresponding to user equipment in a method for transmitting a common signal according to an embodiment of the present invention, and the foregoing and other operations and/or functions of modules in the user equipment 1000 are separately intended to implement corresponding processes of methods in FIG. 9 and FIG. 10; for brevity, details are not described herein again.

Therefore, according to the user equipment in this embodiment of the present invention, a synchronization signal is unbound from a cell identity, so that multiple nodes in a cell can send different synchronization signals to the user equipment, and the user equipment can further distinguish between different nodes according to the synchronization signals and separately establish synchronization with the different nodes, thereby improving communications efficiency and user experience.

Figure 21:
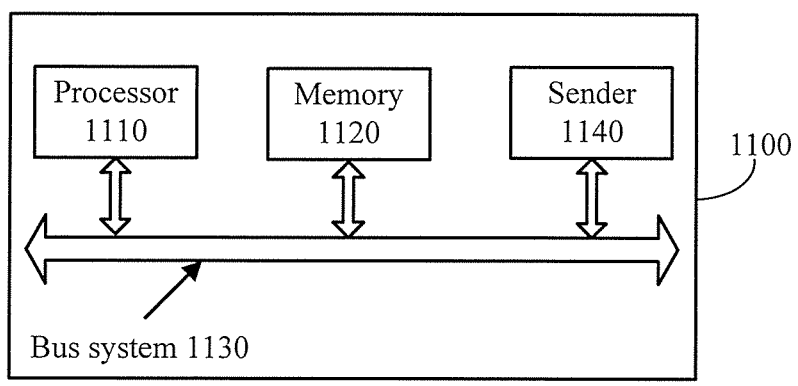
FIG. 21 is a schematic block diagram of a base station according to still another embodiment of the present invention.

FIG. 21 shows a schematic block diagram of a base station 1100 according to still another embodiment of the present invention. As shown in FIG. 21, the base station 1100 includes: a processor 1110, a memory 1120, a bus system 1130, and a sender 1140. The processor 1110, the memory 1120, and the sender 1140 are connected to each other by using the bus system 1130, where the memory 1120 is configured to store an instruction, and the processor 1110 invokes, by using the bus system 1130, the instruction stored in the memory 1120. Specifically, the processor 1110 is configured to determine a first configuration used to send a common signal; and the sender 1140 is configured to send the common signal according to the first configuration determined by the processor 1110.

Therefore, the base station in this embodiment of the present invention sends a common signal in a triggering mode, so that the common signal is sent more flexibly, thereby reducing an overhead during sending of the common signal, reducing a possibility of interference caused by the sending of the common signal to a neighboring cell, and improving user experience.

It should be understood that in this embodiment of the present invention, the processor 1110 may be a central processing unit (Central Processing Unit, "CPU" for short), or the processor 1110 may further be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor or the processor may also be any conventional processor, or the like.

The memory 1120 may include a read-only memory and a random access memory, and provides an instruction and data to the processor 1110. A part of the memory 1120 may further include a nonvolatile random access memory. For example, the memory 1120 may further store information about a device type.

In addition to a data bus, the bus system 1130 may include a power bus, a control bus, a status signal bus, and the like. However, for clarity of description, various buses are marked as the bus system 1130 in the figure.

In an implementation process, the steps in the foregoing methods may be completed by means of an integrated logic circuit of hardware in the processor 1110 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1120. The processor 1110 reads information from the memory 1120, and completes the steps of the foregoing methods in combination with the hardware of the processor 1110. To avoid repetition, details are not described herein again.

The common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

Optionally, the processor 1110 is further configured to, before the first configuration used to send the common signal is determined, determine that a sending condition of the common signal is met.

Optionally, as another embodiment, the sender 1140 is further configured to, before the common signal is sent according to the first configuration, send first configuration information of the common signal to a second base station, where the first configuration information is used to indicate the first configuration; and/or the sender 1140 is further configured to, before the common signal is sent according to the first configuration, send first configuration information of the common signal to user equipment UE, where the first configuration information is used to indicate the first configuration.

Optionally, as another embodiment, the sending condition of the common signal includes at least one of the following conditions:

condition one: the base station receives first request information sent by a second base station, where the first request information is used to request the first base station to send the common signal;

condition two: the base station receives second request information sent by a first UE, where the second request information is used to request the first base station to send the common signal; and condition three: the base station receives a measurement report sent by a first UE, and a first parameter that is in the measurement report and used to indicate a channel state between the first UE and the first base station is lower than a preset threshold.

The sender 1140 is further configured to, when the processor 1110 determines that the sending condition one of the common signal is met, and before the common signal is sent according to the first configuration, send first configuration information of the common signal to the second base station, where the first configuration information is used to indicate the first configuration; and/or the sender 1140 is further configured to, when the processor 1110 determines that the sending condition two or three of the common signal is met, and before the common signal is sent according to the first configuration, send first configuration information of the common signal to a second UE that includes at least the first UE, where the first configuration information is used to indicate the first configuration.

Optionally, as another embodiment, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

Optionally, as another embodiment, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

Optionally, as another embodiment, the processor 1110 is further configured to perform rate matching on at least one first signal, except the common signal, in to-be-sent signals according to the time-frequency resource information of the common signal.

Optionally, as another embodiment, the sender 1140 is further configured to send second configuration information to a third UE, where the second configuration information is used to indicate the time-frequency resource information, so that the third UE performs rate matching according to the second configuration information.

Optionally, as another embodiment, the sender 1140 is further configured to, before the processor 1110 determines that the sending condition of the common signal is met, stop sending the common signal or send the common signal by using a second configuration, where a common signal sending period corresponding to the second configuration is greater than a common signal sending period corresponding to the first configuration.

Optionally, as another embodiment, the first configuration is preset on the first base station; or the processor 1110 is specifically configured to select the first configuration from multiple preset configurations.

Optionally, as another embodiment, the sender 1140 is further configured to, send any other signal or data except the common signal on a time-frequency resource that is reserved for transmitting the common signal but is actually not used to transmit the common signal.

The base station 1100 according to this embodiment of the present invention may be corresponding to a first base station in a method for transmitting a common signal according to an embodiment of the present invention, and the foregoing and other operations and/or functions of modules in the base station 1100 are separately intended to implement corresponding processes of methods in FIG. 1 and FIG. 2; for brevity, details are not described herein again.

Therefore, the base station in this embodiment of the present invention sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 22:
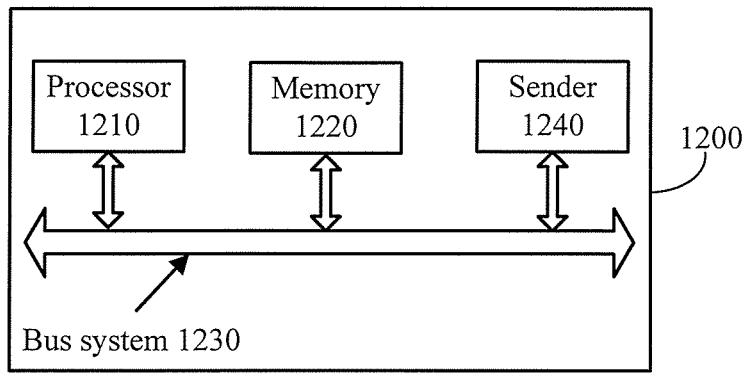
FIG. 22 is a schematic block diagram of a base station according to still another embodiment of the present invention.

FIG. 22 shows a schematic block diagram of a base station 1200 according to still another embodiment of the present invention, where the base station 1200 is used to send a synchronization signal to user equipment UE in a first cell that belongs to the base station 1200, the first cell includes at least two nodes, and the at least two nodes include a first node and at least one second node. As shown in FIG. 22, the base station 1200 includes: a processor 1210, a memory 1220, a bus system 1230, and a sender 1240. The processor 1210, the memory 1220, and the sender 1240 are connected to each other by using the bus system 1230, where the memory 1220 is configured to store an instruction, and the processor 1210 invokes, by using the bus system 1230, the instruction stored in the memory 1220. Specifically, the processor 1210 is configured to generate the synchronization signal according to a sequence initialization identifier, where the synchronization signal includes a primary synchronization signal PSS and/or a secondary synchronization signal SSS, sequence initialization identifiers separately used by the processor 1210 when generating synchronization signals of the at least two nodes are different, and the first cell belongs to the base station; and the sender 1240 is configured to send the synchronization signal generated by the processor 1210.

Therefore, the base station in this embodiment of the present invention unbinds a synchronization signal from a cell identity, so that multiple nodes in a cell can send different synchronization signals to user equipment, and the user equipment can further distinguish between different nodes according to the synchronization signals and separately establish synchronization with the different nodes, thereby improving communications efficiency and user experience.

It should be understood that in this embodiment of the present invention, the processor 1210 may be a central processing unit (Central Processing Unit, "CPU" for short), or the processor 1210 may further be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor or the processor may also be any conventional processor, or the like.

The memory 1220 may include a read-only memory and a random access memory, and provides an instruction and data to the processor 1210. A part of the memory 1220 may further include a nonvolatile random access memory. For example, the memory 1220 may further store information about a device type.

In addition to a data bus, the bus system 1230 may include a power bus, a control bus, a status signal bus, and the like. However, for clarity of description, various buses are marked as the bus system 1230 in the figure.

In an implementation process, the steps in the foregoing methods may be completed by means of an integrated logic circuit of hardware in the processor 1210 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1220. The processor 1210 reads information from the memory 1220, and completes the steps of the foregoing methods in combination with the hardware of the processor 1210. To avoid repetition, details are not described herein again.

Optionally, the same sequence initialization identifier is used by the processor 1210 when generating the synchronization signal of the at least one second node, and the sequence initialization identifier used by the processor 1210 when generating the synchronization signal of the first node is different from the sequence initialization identifier separately used by the first base station when generating the synchronization signal of the at least one second node; or the sequence initialization identifiers separately used by the processor 1210 when generating the synchronization signals of the at least two nodes are different from each other.

Optionally, as another embodiment, the sender 1240 is further configured to send indication information to first user equipment UE, where the indication information is used to indicate a cell identity of the first cell.

Optionally, as another embodiment, the sender 1240 is further configured to, before the synchronization signal is sent, send, to the first UE, the sequence initialization identifier used by the first base station when generating the synchronization signal.

Optionally, as another embodiment, the sequence initialization identifier used by the processor 1210 when generating the synchronization signal of the first node is the cell identity of the first cell.

Optionally, as another embodiment, the first node is a node that continuously sends the synchronization signal, so that the first UE first establishes synchronization with the first node in the first cell.

Optionally, as another embodiment, the base station 1200 further includes:

a receiver 1250, configured to, before the processor 1210 generates the synchronization signal according to the sequence initialization identifier, receive first request information sent by a second base station, where the first request information is used to request the base station to send the synchronization signal; and correspondingly, the processor 1210 is specifically configured to generate the synchronization signal according to the first request information received by the receiver 1250 and the sequence initialization identifier.

Optionally, as another embodiment, the base station 1200 further includes:

a receiver 1250, configured to, before the processor 1210 generates the synchronization signal according to the sequence initialization identifier, receive second request information sent by a second UE, where the second request information is used to request the base station to send the synchronization signal; and correspondingly, the processor 1210 is specifically configured to generate the synchronization signal according to the second request information received by the receiver 1250 and the sequence initialization identifier.

Optionally, as another embodiment, the base station 1200 further includes:

a receiver 1250, configured to, before the processor 1210 generates the synchronization signal according to the sequence initialization identifier, receive a measurement report sent by a second UE; and the processor 1210 is further configured to: determine that a first parameter that is in the measurement report received by the receiver 1250 and is used to indicate a channel state between the second UE and the base station is lower than a preset threshold; and generate the synchronization signal according to the sequence initialization identifier and that the first parameter is lower than the preset threshold.

Optionally, as another embodiment, the sender 1240 is further configured to, before the synchronization signal is sent, send configuration information of the synchronization signal to the first UE, where the configuration information is used by the first UE to detect the synchronization signal.

Optionally, as another embodiment, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

The base station 1200 according to this embodiment of the present invention may be corresponding to a first base station in a method for transmitting a common signal according to an embodiment of the present invention, and the foregoing and other operations and/or functions of modules in the base station 1200 are separately intended to implement corresponding processes of methods in FIG. 3 to FIG. 6; for brevity, details are not described herein again.

Therefore, the base station in this embodiment of the present invention unbinds a synchronization signal from a cell identity, so that multiple nodes in a cell can send different synchronization signals to user equipment, and the user equipment can further distinguish between different nodes according to the synchronization signals and separately establish synchronization with the different nodes, thereby improving communications efficiency and user experience.

Figure 23:
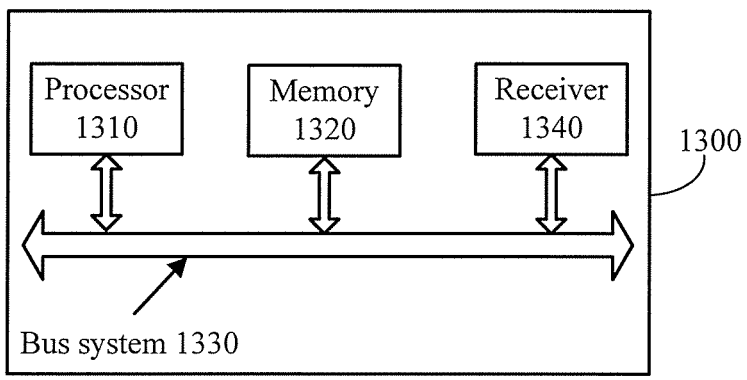
FIG. 23 is a schematic block diagram of user equipment according to still another embodiment of the present invention.

FIG. 23 shows a schematic block diagram of user equipment UE 1300 according to an embodiment of the present invention. As shown in FIG. 23, the UE 1300 includes: a processor 1310, a memory 1320, a bus system 1330, and a receiver 1340. The processor 1310, the memory 1320, and the receiver 1340 are connected to each other by using the bus system 1330, where the memory 1320 is configured to store an instruction, and the processor 1310 invokes, by using the bus system 1330, the instruction stored in the memory 1320. Specifically, the processor 1310 is configured to determine a first configuration of a common signal; and the receiver 1340 is configured to receive, according to the first configuration that is of the common signal and determined by the processor 1310, the common signal that is sent by a first base station when a sending condition of the common signal is met.

Therefore, according to the user equipment in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

It should be understood that in this embodiment of the present invention, the processor 1310 may be a central processing unit (CPU), or the processor 1310 may further be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor or the processor may also be any conventional processor, or the like.

The memory 1320 may include a read-only memory and a random access memory, and provides an instruction and data to the processor 1310. A part of the memory 1320 may further include a nonvolatile random access memory. For example, the memory 1320 may further store information about a device type.

In addition to a data bus, the bus system 1330 may include a power bus, a control bus, a status signal bus, and the like. However, for clarity of description, various buses are marked as the bus system 1330 in the figure.

In an implementation process, the steps in the foregoing methods may be completed by means of an integrated logic circuit of hardware in the processor 1310 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1320. The processor 1310 reads information from the memory 1320, and completes the steps of the foregoing methods in combination with the hardware of the processor 1310. To avoid repetition, details are not described herein again.

Optionally, the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1.

Optionally, as another embodiment, the processor 1310 specifically determines the first configuration according to first configuration information received by the receiver 1340, where the first configuration information is used to indicate the first configuration.

Optionally, as another embodiment, the sending condition of the common signal includes at least one of the following conditions:

condition one: the first base station receives first request information sent by a second base station, where the first request information is used to request the first base station to send the common signal;

condition two: the first base station receives second request information sent by a second UE, where the second request information is used to request the first base station to send the common signal; and condition three: the first base station receives a measurement report sent by a second UE, and a first parameter that is in the measurement report and used to indicate a channel state between the second UE and the first base station is lower than a preset threshold.

Optionally, as another embodiment, the first configuration includes at least one of the following information: information about a time-frequency resource used during sending of the common signal, information about a code resource used during the sending of the common signal, identification information of the common signal, information about an antenna port corresponding to the common signal, and information about power used during the sending of the common signal.

Optionally, as another embodiment, the information about the time-frequency resource used during the sending of the common signal includes at least one of the following information: sending time information of the common signal, information about sending times of the common signal, sending interval information of the common signal, type information of a carrier carrying the common signal, frequency information of the carrier carrying the common signal, information about a physical resource block PRB carrying the common signal, and pattern information of a resource element RE occupied by the common signal; and the information about the code resource used during the sending of the common signal includes scrambling code information of the common signal.

Optionally, as another embodiment, the processor 1310 is further configured to perform rate matching on at least one first signal, except the common signal, in to-be-sent signals of the first base station according to the time-frequency resource information of the common signal.

Optionally, as another embodiment, the receiver 1340 is further configured to, receive, on a time-frequency resource that is reserved for transmitting the common signal but is actually not used to transmit the common signal, any other signal or data, sent by the first base station, except the common signal.

The user equipment 1300 according to this embodiment of the present invention may be corresponding to user equipment in a method for transmitting a common signal according to an embodiment of the present invention, and the foregoing and other operations and/or functions of modules in the user equipment 1300 are separately intended to implement a corresponding process of the method in FIG. 7; for brevity, details are not described herein again.

Therefore, according to the user equipment in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 24:
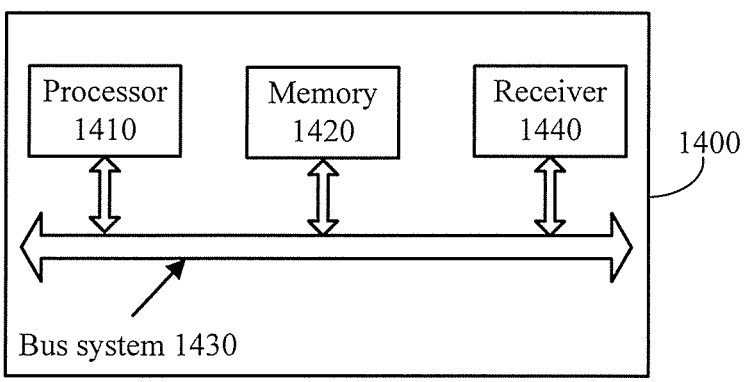
FIG. 24 is a schematic block diagram of user equipment according to still another embodiment of the present invention.

FIG. 24 shows a schematic block diagram of user equipment UE 1400 according to an embodiment of the present invention. As shown in FIG. 24, the UE 1400 includes: a processor 1410, a memory 1420, a bus system 1430, and a receiver 1440. The processor 1410 and the memory 1420 are connected to each other by using the bus system 1430, where the memory 1420 is configured to store an instruction, and the processor 1410 invokes, by using the bus system 1430, the instruction stored in the memory 1420. Specifically, the receiver 1440 is configured to receive indication information sent by a base station, where the indication information is used to indicate a time-frequency resource occupied by a common signal that is transmitted non-periodically, and the common signal includes at least one of the following signals: a primary synchronization signal PSS, a secondary synchronization signal SSS, a physical broadcast channel PBCH, a cell-specific reference signal CRS, a discovery signal DS, and system information block type 1 SIB1; and the processor 1410 is configured to perform rate matching according to the indication information received by the receiver 1440.

It should be understood that in this embodiment of the present invention, the processor 1410 may be a central processing unit (Central Processing Unit, "CPU" for short), or the processor 1410 may further be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor or the processor may also be any conventional processor, or the like.

The memory 1420 may include a read-only memory and a random access memory, and provides an instruction and data to the processor 1410. A part of the memory 1420 may further include a nonvolatile random access memory. For example, the memory 1420 may further store information about a device type.

In addition to a data bus, the bus system 1430 may include a power bus, a control bus, a status signal bus, and the like. However, for clarity of description, various buses are marked as the bus system 1430 in the figure.

In an implementation process, the steps in the foregoing methods may be completed by means of an integrated logic circuit of hardware in the processor 1410 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1420. The processor 1410 reads information from the memory 1420, and completes the steps of the foregoing methods in combination with the hardware of the processor 1410. To avoid repetition, details are not described herein again.

The user equipment 1400 according to this embodiment of the present invention may be corresponding to a fourth user equipment in a method for transmitting a common signal according to an embodiment of the present invention, and the foregoing and other operations and/or functions of modules in the user equipment 1400 are separately intended to implement a corresponding process of the method in FIG. 8; for brevity, details are not described herein again.

Therefore, according to the user equipment in this embodiment of the present invention, a base station sends a common signal in a triggering mode, so that the common signal is sent more flexibly, thereby reducing an overhead during sending of the common signal, reducing a possibility of interference caused by the sending of the common signal to a neighboring cell, and improving user experience.

Figure 25:
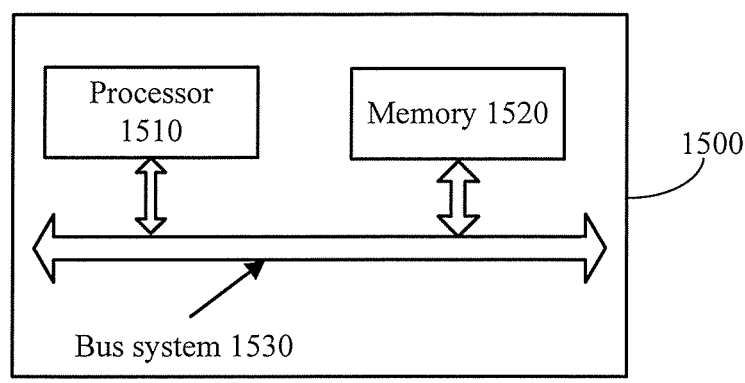
FIG. 25 is a schematic block diagram of user equipment according to still another embodiment of the present invention.

FIG. 25 shows a schematic block diagram of user equipment UE 1500 according to an embodiment of the present invention, where the user equipment 1500 is used to receive a synchronization signal sent by a first cell by using a first base station to which the first cell belongs, the first cell includes at least two nodes, and the at least two nodes include a first node and at least one second node. As shown in FIG. 25, the UE 1500 includes: a processor 1510, a memory 1520, and a bus system 1530. The processor 1510 and the memory 1520 are connected to each other by using the bus system 1530, where the memory 1520 is configured to store an instruction, and the processor 1510 invokes, by using the bus system 1530, the instruction stored in the memory 1520, so as to: acquire a sequence initialization identifier of a synchronization signal, where the synchronization signal includes a primary synchronization signal PSS and/or a secondary synchronization signal SSS, and sequence initialization identifiers of synchronization signals of the at least two nodes are different; and detect, according to the sequence initialization identifier of the synchronization signal, the synchronization signal sent by the first base station.

Therefore, according to the user equipment in this embodiment of the present invention, a synchronization signal is unbound from a cell identity, so that multiple nodes in a cell can send different synchronization signals to the user equipment, and the user equipment can further distinguish between different nodes according to the synchronization signals and separately establish synchronization with the different nodes, thereby improving communications efficiency and user experience.

It should be understood that in this embodiment of the present invention, the processor 1510 may be a central processing unit (Central Processing Unit, "CPU" for short), or the processor 1510 may further be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor or the processor may also be any conventional processor, or the like.

The memory 1520 may include a read-only memory and a random access memory, and provides an instruction and data to the processor 1510. A part of the memory 1520 may further include a nonvolatile random access memory. For example, the memory 1520 may further store information about a device type.

In addition to a data bus, the bus system 1530 may include a power bus, a control bus, a status signal bus, and the like. However, for clarity of description, various buses are marked as the bus system 1530 in the figure.

In an implementation process, the steps in the foregoing methods may be completed by means of an integrated logic circuit of hardware in the processor 1510 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1520. The processor 1510 reads information from the memory 1520, and completes the steps of the foregoing methods in combination with the hardware of the processor 1510. To avoid repetition, details are not described herein again.

Optionally, the processor 1510 receives, by using the receiver 1540, the sequence initialization identifier of the PSS and/or the SSS that are/is sent by the first base station.

Optionally, the synchronization signal of the at least one second node has the same sequence initialization identifier, and the sequence initialization identifier of the synchronization signal of the first node is different from the sequence initialization identifier of the synchronization signal of the at least one second node; or the sequence initialization identifiers of the synchronization signals of the at least two nodes are different from each other.

Optionally, as another embodiment, the receiver 1540 is further configured to receive indication information sent by the first base station, where the indication information is used to indicate a cell identity of the first cell.

Optionally, as another embodiment, the processor 1510 is specifically configured to acquire the sequence initialization identifier by using the receiver 1540 to receive the sequence initialization identifier that is of the synchronization signal and sent by first base station.

Optionally, as another embodiment, the sequence initialization identifier of the synchronization signal of the first node is the cell identity of the first cell.

Optionally, as another embodiment, the first node is a node that continuously sends the synchronization signal, so that the user equipment UE first establishes synchronization with the first node in the first cell.

Optionally, as another embodiment, the processor 1510 is specifically configured to detect, according to the sequence initialization identifier of the synchronization signal, the synchronization signal that is sent by the first base station when a sending condition of a common signal is met.

Optionally, as another embodiment, the UE 1500 further includes:

a sender 1550, configured to, before the processor 1510 acquires the sequence initialization identifier of the synchronization signal, send request information to the first base station, where the request information is used to request the first base station to send the synchronization signal; and correspondingly, the processor 1510 is specifically configured to detect, according to the sequence initialization identifier of the synchronization signal, the synchronization signal sent by the first base station according to the request information sent by the sender 1550.

Optionally, as another embodiment, the receiver 1540 is further configured to, before the processor 1510 detects, according to the sequence initialization identifier of the synchronization signal, the synchronization signal that is sent by the first base station when the sending condition of the common signal is met, receive configuration information that is of the synchronization signal and sent by the first base station; and correspondingly, the processor 1510 is specifically configured to, detect, according to the sequence initialization identifier of the synchronization signal and the configuration information that is of the synchronization signal and received by the receiver 1540, the synchronization signal sent by the first base station according to the request information.

Optionally, as another embodiment, the configuration information of the synchronization signal includes at least one of the following information: sending time information of the synchronization signal, information about sending times of the synchronization signal, sending interval information of the synchronization signal, type information of a carrier carrying the synchronization signal, identification information of the synchronization signal, transmit power information of the synchronization signal, antenna port information of the synchronization signal, and pattern information of a resource element RE occupied by the synchronization signal.

The user equipment 1500 according to this embodiment of the present invention may be corresponding to user equipment in a method for transmitting a common signal according to an embodiment of the present invention, and the foregoing and other operations and/or functions of modules in the user equipment 1500 are separately intended to implement corresponding processes of methods in FIG. 9 and FIG. 10; for brevity, details are not described herein again.

Therefore, according to the user equipment in this embodiment of the present invention, a synchronization signal is unbound from a cell identity, so that multiple nodes in a cell can send different synchronization signals to the user equipment, and the user equipment can further distinguish between different nodes according to the synchronization signals and separately establish synchronization with the different nodes, thereby improving communications efficiency and user experience.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for receiving a signal, comprising:
   receiving, by a user equipment (UE) from a first base station, a first configuration for a first common signal, the first common signal comprises a primary synchronization signal (PSS), a secondary synchronization signal (SSS), and a physical broadcast channel (PBCH), the first configuration comprises time-frequency resource information about a time-frequency resource for the first common signal and carrier type information of a carrier carrying the first common signal;
   receiving, by the UE, a second common signal before receiving the first configuration; and
   receiving, by the UE, the first common signal from the first base station according to the first configuration;
   wherein the reception of the second common signal uses a third configuration, and a periodicity of the second common signal is greater than a common signal periodicity corresponding to the first configuration.

2. The method according to claim 1, wherein the first configuration further comprises one or both of: code resource information about a code resource used by the first common signal or antenna port information about an antenna port corresponding to the first common signal.

3. The method according to claim 1, wherein the time-frequency resource information further comprises at least one of: time information of the first common signal, information about times of the first common signal, carrier frequency information of the carrier carrying the first common signal, physical resource block (PRB) information about a PRB carrying the first common signal, or resource element (RE) pattern information of a RE occupied by the first common signal.

4. The method according to claim 1, wherein the method further comprises:
performing, by the UE, rate matching on at least one first signal in to-be-sent signals of the first base station according to the time-frequency resource information of the first common signal, with the at least one first signal excluding the first common signal.

5. The method according to claim 1, wherein the method further comprises:
receiving, by the UE, other signal or data from the first base station, except the first common signal on a time-frequency resource for the first common signal but is actually not used to send the first common signal.

6. The method according to claim 1, wherein the method further comprises:
not receiving, by the UE, other signals in the time-frequency resource corresponding to the first common signal.

7. The method according to claim 1, wherein
the first configuration further comprises signal identification information of the first common signal, and power information about sending power for the first common signal, the time-frequency resource information comprises sending time interval information of the first common signal.

8. A method for sending a signal, comprising:
determining, by a first base station, a first configuration for a first common signal, the first common signal comprises a primary synchronization signal (PSS), a secondary synchronization signal (SSS), and a physical broadcast channel (PBCH), the first configuration comprises time-frequency resource information about a time-frequency resource for the first common signal and carrier type information of a carrier carrying the first common signal;
sending, by the first base station, the first configuration to a user equipment (UE);
sending, by the first base station, a second common signal before sending the first configuration; and
sending, by the first base station, the first common signal to the UE according to the first configuration;
wherein the sending of the second common signal uses a third configuration, and a periodicity of the second common signal is greater than a common signal periodicity corresponding to the first configuration.

9. The method according to claim 8, wherein the first configuration further comprises one or both of: code resource information about a code resource used by the first common signal or antenna port information about an antenna port corresponding to the first common signal.

10. The method according to claim 8, wherein the time-frequency resource information further comprises at least one of: time information of the first common signal, information about times of the first common signal, carrier frequency information of the carrier carrying the first common signal, physical resource block (PRB) information about a PRB carrying the first common signal, or resource element (RE) pattern information of a RE occupied by the first common signal.

11. The method according to claim 8, wherein the method further comprises:
performing, by the first base station, rate matching on at least one first signal in to-be-sent signals according to the time-frequency resource information of the first common signal, with the at least one first signal excluding the first common signal.

12. The method according to claim 8, wherein:
the first configuration is preset on the first base station; or
determining the first configuration comprises selecting the first configuration from multiple preset configurations.

13. The method according to claim 8, wherein the method further comprises:
sending, by the first base station, other signal or data to the UE, except the first common signal on a time-frequency resource for the first common signal but is actually not used to send the first common signal.

14. The method according to claim 8, wherein the method further comprises:
not sending, by the first base station, other signals in the time-frequency resource corresponding to the first common signal.

15. The method according to claim 8, wherein
the first configuration further comprises signal identification information of the first common signal, and power information about sending power for the first common signal, the time-frequency resource information comprises sending time interval information of the first common signal.

16. A user equipment (UE), comprising:
a receiver configured to:
receive, from a first base station, a first configuration for a first common signal, the first common signal comprises a primary synchronization signal (PSS), a secondary synchronization signal (SSS), and a physical broadcast channel (PBCH), the first configuration comprises time-frequency resource information about a time-frequency resource for the first common signal and carrier type information of a carrier carrying the first common signal;
receive a second common signal before receiving the first configuration; and
receive the first common signal from the first base station according to the first configuration;
wherein the reception of the second common signal uses a third configuration, and a periodicity of the second common signal is greater than a common signal periodicity corresponding to the first configuration.

17. The UE according to claim 16, wherein the first configuration further comprises one or both of: code resource information about a code resource used by the first common signal or antenna port information about an antenna port corresponding to the first common signal.

18. The UE according to claim 16, wherein the time-frequency resource information further comprises at least one of: time information of the first common signal, information about times of the first common signal, carrier frequency information of the carrier carrying the first common signal, physical resource block (PRB) information about a PRB carrying the first common signal, or resource element (RE) pattern information of a RE occupied by the first common signal.

19. The UE according to claim 16, wherein the UE further comprises:

a processor configured to perform rate matching on at least one first signal in to-be-sent signals of the first base station according to the time-frequency resource information of the first common signal, with the at least one first signal excluding the first common signal.

20. The UE according to claim 16, wherein the receiver is further configured to receive other signal or data from the first base station, except the first common signal on a time-frequency resource for the first common signal but is actually not used to send the first common signal.

21. The user equipment according to claim 16, wherein the receiver is further configured to:
not receive other signals in the time-frequency resource corresponding to the first common signal.

22. The UE according to claim 16, wherein
the first configuration further comprises signal identification information of the first common signal, and power information about sending power for the first common signal, the time-frequency resource information comprises sending time interval information of the first common signal.

23. A base station, comprising:
a processor configured to determine a first configuration for a first common signal, the first common signal comprises a primary synchronization signal (PSS), a secondary synchronization signal (SSS), and a physical broadcast channel (PBCH), the first configuration comprises time-frequency resource information about a time-frequency resource for the first common signal and carrier type information of a carrier carrying the first common signal;
a transmitter coupled to the processor, wherein the transmitter is configured to:
send the first configuration to a user equipment (UE);
send a second common signal before sending the first configuration; and
send the first common signal according to the first configuration;
wherein the sending of the second common signal uses a third configuration, and a periodicity of the second common signal is greater than a common signal periodicity corresponding to the first configuration.

24. The base station according to claim 23, wherein the first configuration further comprises one or both of: code resource information about a code resource used by the first common signal or antenna port information about an antenna port corresponding to the first common signal.

25. The base station according to claim 23, wherein the time-frequency resource information further comprises at least one of: time information of the first common signal, information about times of the first common signal, carrier frequency information of the carrier carrying the first common signal, physical resource block (PRB) information about a PRB carrying the first common signal, or resource element (RE) pattern information of a RE occupied by the first common signal.

26. The base station according to claim 23, wherein the processor is further configured to perform rate matching on at least one first signal in to-be-sent signals according to the time-frequency resource information of the first common signal, with the at least one first signal excluding the first common signal.

27. The base station according to claim 23, wherein:
the first configuration is preset on the base station; or
determining the first configuration comprises selecting the first configuration from multiple preset configurations.

28. The base station according to claim 23, wherein the transmitter is further configured to send other signal or data to the UE, except the first common signal on a time-frequency resource for the first common signal but is actually not used to send the first common signal.

29. The base station according to claim 23, wherein the transmitter is further configured to:
not send other signals in the time-frequency resource corresponding to the first common signal.

30. The base station according to claim 23, wherein:
the first configuration further comprises signal identification information of the first common signal, and power information about sending power for the first common signal, the time-frequency resource information comprises sending time interval information of the first common signal.

31. A non-transitory computer-readable storage medium having processor-executable instructions stored thereon, that when executed by a processor, performs:
receiving, from a first base station, a first configuration for a first common signal, the first common signal comprises a primary synchronization signal (PSS), a secondary synchronization signal (SSS) and a physical broadcast channel (PBCH), the first configuration comprising time-frequency resource information about a time-frequency resource for the first common signal and carrier type information of a carrier carrying the first common signal;
receiving a second common signal before receiving the first configuration; and
receiving the first common signal from the first base station according to the first configuration;
wherein the reception of the second common signal uses a third configuration and a periodicity of the second common signal is greater than a common signal periodicity corresponding to the first configuration.

32. The non-transitory computer-readable storage medium according to claim 31, wherein the first configuration further comprises one or both of: code resource information about a code resource used by the first common signal or antenna port information about an antenna port corresponding to the first common signal.

33. The non-transitory computer-readable storage medium according to claim 31, wherein the time-frequency resource information further comprises at least one of: time information of the first common signal, information about times of the first common signal, carrier frequency information of the carrier carrying the first common signal, physical resource block (PRB) information about a PRB carrying the first common signal, or resource element (RE) pattern information of a RE occupied by the first common signal.

34. The non-transitory computer-readable storage medium according to claim 31, wherein the processor-executable instructions, when executed further performs:
performing rate matching on at least one first signal in to-be-sent signals of the first base station according to the time-frequency resource information of the first common signal, with the at least one first signal excluding the first common signal.

35. The non-transitory computer-readable storage medium according to claim 31, wherein the processor-executable instructions, when executed, further performs:
receiving other signal or data from the first base station, except the first common signal on a time-frequency resource for the first common signal but is actually not used to send the first common signal.

36. The non-transitory computer-readable storage medium according to claim 31, wherein the processor-executable instructions, when executed, further performs:
not receiving other signals in the time-frequency resource corresponding to the first common signal.

37. The non-transitory computer-readable storage medium according to claim 31, wherein:
the first configuration further comprises signal identification information of the first common signal, and power information about sending power for the first common signal, the time-frequency resource information comprises sending time interval information of the first common signal.

38. A non-transitory computer-readable storage medium having processor-executable instructions stored thereon, wherein the processor-executable instructions, when executed by a processor, performs:
determining a first configuration for a first common signal, the first common signal comprises a primary synchronization signal (PSS), a secondary synchronization signal (SSS), and a physical broadcast channel (PBCH), the first configuration comprises time-frequency resource information about a time-frequency resource for the first common signal and carrier type information of a carrier carrying the first common signal;
sending the first configuration to a user equipment (UE);
sending a second common signal before sending the first configuration; and
sending the first common signal according to the first configuration;
wherein the sending of the second common signal uses a third configuration and a periodicity of the second common signal is greater than a common signal periodicity corresponding to the first configuration.

39. The non-transitory computer-readable storage medium according to claim 38, wherein the first configuration further comprises one or both of: code resource information about a code resource used by the first common signal, or antenna port information about an antenna port corresponding to the first common signal.

40. The non-transitory computer-readable storage medium according to claim 38, wherein the time-frequency resource information further comprises at least one of: time information of the first common signal, information about times of the first common signal, carrier frequency information of the carrier carrying the first common signal, physical resource block (PRB) information about a PRB carrying the first common signal, or resource element (RE) pattern information of a RE occupied by the first common signal.

41. The non-transitory computer-readable storage medium according to claim 38, wherein the processor-executable instructions, when executed, further performs:
performing rate matching on at least one first signal in to-be-sent signals according to the time-frequency resource information of the first common signal, with the at least one first signal excluding the first common signal.

42. The non-transitory computer-readable storage medium according to claim 38, wherein:
the first configuration is preset on the first base station; or
determining the first configuration comprises selecting the first configuration from multiple preset configurations.

43. The non-transitory computer-readable storage medium according to claim 38, wherein the processor-executable instructions, when executed, further performs:
sending other signal or data to the UE, except the first common signal on a time-frequency resource for the first common signal but is actually not used to send the first common signal.

44. The non-transitory computer-readable storage medium according to claim 38, wherein the processor-executable instructions, when executed, further performs:
not sending other signals in the time-frequency resource corresponding to the first common signal.

45. The non-transitory computer-readable storage medium according to claim 38, wherein:
the first configuration further comprises signal identification information of the first common signal, and power information about sending power for the first common signal, the time-frequency resource information comprises sending time interval information of the first common signal.

* * * * *